United States Patent
Yang et al.

(10) Patent No.: US 9,852,652 B2
(45) Date of Patent: Dec. 26, 2017

(54) METHOD AND APPARATUS FOR POSITION AND MOTION INSTRUCTION

(71) Applicant: Atheer, Inc., Mountain View, CA (US)

(72) Inventors: Allen Yang Yang, Richmond, CA (US); Mohamed Nabil Hajj Chehade, Los Angeles, CA (US); Sina Fateh, Mountain View, CA (US); Sleiman Itani, East Palo Alto, CA (US)

(73) Assignee: Atheer, Inc., Mountain View, CA (US)

( * ) Notice: Subject to any disclaimer, the term of this patent is extended or adjusted under 35 U.S.C. 154(b) by 360 days.

(21) Appl. No.: 14/087,688

(22) Filed: Nov. 22, 2013

(65) Prior Publication Data

US 2014/0139340 A1    May 22, 2014

Related U.S. Application Data

(60) Provisional application No. 61/729,413, filed on Nov. 22, 2012.

(51) Int. Cl.
  *G08B 23/00*  (2006.01)
  *G09B 19/00*  (2006.01)
(52) U.S. Cl.
  CPC .................... *G09B 19/003* (2013.01)
(58) Field of Classification Search
  CPC ..................... G06T 1/00; A61B 1/00
  See application file for complete search history.

(56) References Cited

U.S. PATENT DOCUMENTS

| | | | | |
|---|---|---|---|---|
| 2007/0060849 A1* | 3/2007 | Bluman | ............... | A61H 1/0274 601/33 |
| 2013/0234926 A1* | 9/2013 | Rauber | ................ | G06F 3/0487 345/156 |
| 2013/0278631 A1* | 10/2013 | Border | ................ | G02B 27/017 345/633 |
| 2013/0300759 A1* | 11/2013 | White | .................... | G06F 3/011 345/589 |

\* cited by examiner

*Primary Examiner* — Shirley Lu
(74) *Attorney, Agent, or Firm* — Mohr Intellectual Property Law Solutions, P.C.

(57) ABSTRACT

World data is established, including real-world position and/or real-world motion of an entity. Target data is established, including planned or ideal position and/or motion for the entity. Guide data is established, including information for guiding a person or other subject in bringing world data into match with target data. The guide data is outputted to the subject as virtual and/or augmented reality data. Evaluation data may be established, including a comparison of world data with target data. World data, target data, guide data, and/or evaluation data may be dynamically updated. Subjects may be instructed in positions and motions by using guide data to bring world data into match with target data, and by receiving evaluation data. Instruction includes physical therapy, sports, recreation, medical treatment, fabrication, diagnostics, repair of mechanical systems, etc.

30 Claims, 28 Drawing Sheets

METHOD AND APPARATUS FOR POSITION AND MOTION INSTRUCTION

CLAIM OF PRIORITY

This application claims the benefit of U.S. Provisional Application Ser. No. 61/729,413 filed on Nov. 22, 2012, the contents of which are incorporated by reference for all intents and purposes.

FIELD OF THE INVENTION

The present invention relates to instruction systems. More particularly, the present invention relates to systems for instructing subjects regarding targeted positions and motions as compared with actual positions and motions, regardless of whether those positions and motions are executed by the user or by some other person or system.

DESCRIPTION OF RELATED ART

For many activities body position and/or body motion may impact success and/or safety. For example, how a user grips and swings a tennis racket may affect whether the ball is hit or goes where the user desires, the chance of injury, etc. Position and motion also may be significant for non-human phenomena, for example, how the components of an internal combustion engine move (or do not move) can be strongly indicative of whether the engine is operating properly, what may be wrong with the engine if it is not operating properly, etc.

Description of position or motion relies on shared communication, e.g. the same language, relevant specialized terminology, a shared mindset regarding the activity, etc. For example, a subject attempting physical therapy based on instructions may not understand specific anatomical references, may lack understanding of anatomy, physiology, etc. that underlies and informs the motion the user hopes to perform, etc. Demonstration of positions and motions, e.g. in the form of photographs, videos, etc. may require a user to make a mental and physical "leap" to transfer the example motion the user sees into a first-person motion that the user executes.

In addition, the ability to learn from example may be limited by a user's ability to observe, for example based on prior familiarity with the topic at hand. For example, someone experienced at golf may more readily pick up on fine details of stance, swing motion, etc. than someone with no golf experience (even though the person with the least experience may be most in need of such information.)

Real-time feedback may provide guidance tailored to a student's performance, but adaptive feedback may be limited by the availability of instructors. In particular, in difficult conditions and/or without advance notice access to instruction and feedback can be limited. Examples might include a need for a person untrained in CPR or first aid to perform such tasks.

BRIEF SUMMARY OF THE INVENTION

The present invention contemplates a variety of systems, apparatus, methods, and paradigms for position and motion instruction.

In one embodiment of the present invention, an apparatus is provided that includes a processor, a sensor in communication with the processor, and a visual display in communication with the processor. The sensor and/or processor are adapted to establish world data that includes a world position of an entity and/or a world motion of the entity. The processor is adapted to establish target data that includes a target position of the entity and/or a target motion of the entity. The processor is adapted to establish guide data that guides the entity toward the target position and/or target motion. The display is adapted to output the guide data.

The display may enable passage of at least a portion of the world data therethrough. At least a portion of the display may be transparent. The display may be adapted to output at least a portion of the world data.

The display may be adapted to output guide data at least substantially aligned with the world data. The display may be adapted to output the guide data proximate the world data.

The sensor may be disposed on the user. The sensor may be distal from the user. The sensor may include an imager. The apparatus may include first and second imagers arranged as a stereo pair. The sensor may include a depth sensor, a motion sensor, an ultrasonic sensor, a gyroscope, an accelerometer, a contact sensor, and/or a pressure sensor.

The display may be a three dimensional display. The apparatus may include first and second displays in a stereo configuration. The display may include an LED display, an OLED display, an LCD display, a plasma display, a CRT, and/or a laser display.

The apparatus may include a body adapted to be worn by a subject. The body may include a headset. The sensor may be disposed on the body. The sensor may be disposed such that when the subject wears the body, the field of view of the sensor may be substantially aligned with the line of sight of the subject. The processor may be disposed on the body. The display may be disposed on the body. The display may be disposed such that when the subject wears the body, the display may be proximate to and disposed substantially aligned with the subject's eyes.

The apparatus may include a communicator in communication with the processor, the communicator being adapted to communicate with an entity external to the apparatus. The communicator may be a wireless communicator.

The sensor may include a biological sensor.

The sensor and/or the processor may be adapted to dynamically update at least a portion of the world data until a condition is satisfied. The processor may be adapted to dynamically update at least a portion of the target data responsive to the world data until a condition is satisfied. The processor may be adapted to dynamically update at least a portion of the guide data responsive to the target data until a condition is satisfied.

The processor may be adapted to establish evaluation data substantially representative of an evaluation of the world data against the target data. The processor may be adapted to dynamically update at least a portion of the evaluation data until the condition may be satisfied.

The display may be adapted to output at least a portion of the evaluation data.

In another embodiment of the present invention, an apparatus is provided that includes a processor, a sensor in communication with the processor, and a visual display in communication with the processor. The sensor and/or processor are adapted to establish world data that includes a world position of an entity and/or a world motion of the entity. The sensor and/or processor are adapted to dynamically update the world data until a condition is satisfied. The processor is adapted to establish target data that includes a target position of the entity and/or a target motion of the entity. The processor is adapted to establish guide data that guides the entity toward the target position and/or target motion. The guide data includes a visual representation of at least a portion of the subject, the visual representation being at least substantially anthropomorphic. The processor is adapted to establish evaluation data that is substantially representative of an evaluation of the target data against the world data. The processor is adapted to dynamically update at least a portion of the target data responsive to the world data until the condition is satisfied. The processor is adapted to dynamically update at least a portion of the guide data responsive to the target data until the condition is satisfied. The processor is adapted to dynamically update at least a portion of the evaluation data until the condition is satisfied. The display is adapted to output the guide data and at least a portion of the evaluation data.

In another embodiment of the present invention, a method is provided that includes establishing world data that includes a world position of an entity and/or a world motion of the entity. The method includes establishing target data that includes a target position of the entity and/or a target motion of the entity. The method includes establishing guide data that is adapted to guide the entity toward the target position and/or the target motion. The method includes outputting the guide data to a subject. The guide data includes virtual reality data and/or augmented reality data.

The world data may include a world point of contact with the entity. The target data may include a target point of contact with the entity. The guide data may include a guide point of contact with the entity. The world data may include a world path for the entity. The target data may include a target path for the entity. The guide data may include a guide path for the entity. The world data may include a world model for at least a portion of the entity. The target data may include a target model for at least a portion of the entity. The guide data may include a guide model for at least a portion of the entity. The guide data may include a visual representation of at least a portion of the entity. The guide data may include a visual representation of at least a portion of the subject. The visual representation may be at least substantially anthropomorphic. The guide data may include at least one of a group consisting of text instructions, audio instructions, a visual image, an animation, and an icon.

The method may include outputting the guide data such that at least a portion of the world data is visible therewith. The method may include passing at least a portion of the world data to the subject. The method may include outputting at least a portion of the world data to the subject.

The method may include outputting the guide data at least substantially aligned with the entity. The method may include outputting the guide data at least substantially aligned with the world data.

The target data may be representative of physical therapy, sports activity, recreational activity, physical training, medical training, medical treatment, medical diagnostics, first aid/cpr, fabrication, repair, and/or device/system operation.

The world entity may include a mechanical system. The world entity may include a virtual reality entity and/or an augmented reality entity. The method may include dynamically updating at least a portion of the world data until a condition is satisfied. The method may include dynamically updating at least a portion of the target data responsive to the world data until a condition is satisfied. The method may include dynamically updating at least a portion of the guide data responsive to the target data until a condition is satisfied.

The method may include establishing evaluation data substantially representing an evaluation of the world data against the target data. The method may include dynamically updating at least a portion of the evaluation data until a condition may be satisfied. The method may include outputting at least a portion of the evaluation data to the subject. The evaluation data may include at least one of a group consisting of text instructions, audio instructions, a visual image, an animation, and an icon.

In another embodiment of the present invention, a method is provided that includes establishing world data that includes a world position of an entity and/or a world motion of the entity. The method includes establishing target data that includes a target position of the entity and/or a target motion of the entity. The method includes establishing guide data that is adapted to guide the entity toward the target position and/or the target motion. The method includes outputting the guide data to a subject. The guide data includes virtual reality data and/or augmented reality data. The method includes establishing evaluation data substantially representing an evaluation of the target data against the world data. The method includes dynamically updating at least a portion of the world data until a condition satisfied, dynamically updating at least a portion of the target data responsive to the world data until the condition is satisfied, dynamically updating at least a portion of the guide data responsive to the target data until the condition is satisfied, and dynamically updating at least a portion of the evaluation data until the condition is satisfied. The method includes outputting at least a portion of the comparison data to the subject. The guide data may include virtual reality data and/or augmented reality data. The guide data may include a visual representation of at least a portion of the subject, the visual representation being at least substantially anthropomorphic.

In another embodiment of the present invention, an apparatus is provided that includes means for establishing world data that includes a world position of an entity and/or a world motion of the entity, means for establishing target data that includes a target position of the entity and a target motion of the entity, means for establishing guide data that is adapted to guide the entity toward the target position and/or target motion, means for outputting the guide data to a subject. The guide data includes virtual reality data and/or augmented reality data.

BRIEF DESCRIPTION OF THE SEVERAL VIEWS OF THE DRAWINGS

Like reference numbers generally indicate corresponding elements in the figures.

DETAILED DESCRIPTION OF THE INVENTION

It is noted that for simplicity, some of the following description is written to refer to position/motion instruction directed to a subject's kinesiology, that is, to the position and/or motion of the body of the subject himself or herself. However, this is an example only, and the present invention is not limited only to kinesiology instruction.

In addition, the terms "position" and "motion" as used herein are to be understood broadly. A position, for example considering a hand position, is not necessarily limited to only a set of coordinates in space, in the sense of an x, y, z position. Rather, a hand position may include specific arrangements of fingers, angles at certain joints, an overall orientation, etc. Likewise, a motion is not necessarily limited to a change from one set of coordinates to another, but may encompass substantially any dynamic transition. The terms position and motion might also be considered as "posture" and "gesture", or individual positions, motions, etc. could be defined very specifically. However, for purposes of simplicity, an arrangement wherein the goal is a substantially static configuration is typically referred to herein as a position, while an arrangement wherein the goal is a substantially dynamically changing configuration is typically referred to herein as a motion.

Figure 1:
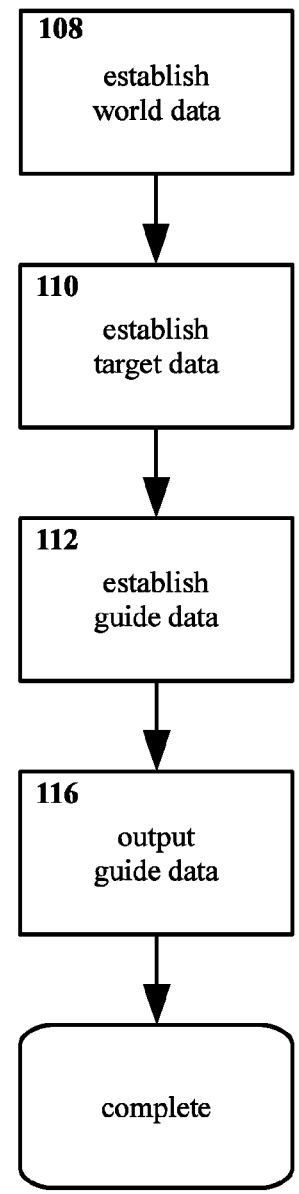
FIG. 1 illustrates an example embodiment of a method for position and/or motion instruction according to the present invention, in flowchart form.

Referring now to FIG. 1, in an example embodiment of a method of position/motion instruction in accordance with the present invention, world data is established 108. World data at least substantially represents the actual position and/or motion of one or more entities, i.e. "in the real world". For kinesiology applications, world data may include the position and/or motion of a human subject, or some portion of the subject's body.

With regard to the terms "entity" and "subject", an entity is an object, location, creature, phenomenon, etc. to which a position and/or a motion is to be applied. A subject is a person to be instructed or otherwise informed in the execution of a position and/or motion. In certain instances, a subject may be considered an actor, with an entity being a thing that is acted upon. However, it is emphasized that an entity and a subject may be one and the same, or at least closely related, in at least some embodiments. For example, for physical therapy motions of a hand, the subject (executing the motions) may be a patient performing exercises, while the entity (what is being moved) may be the patient's hand. In such an example, the patient is arguably both subject and entity.

Returning to a description of world data, typically though not necessarily world data is established 108 in a data processor, such as a processor in a personal computer, smart phone, head mounted display, etc.

The present invention is not particularly limited with regard to what entities may be considered. In particular, the terms "world" and/or "world data" should not be understood to imply that the present invention is limited only to considering objects within the physical world as entities. For example, in certain embodiments, virtual reality entities and/or augmented reality entities may be utilized; in such instances, world data will not necessarily reflect the position and/or motion of a physical entity, but may reflect the position and/or motion of a data construct (i.e. a virtual or augmented reality entity).

The present invention is not particularly limited with regard to subjects. Typically, though not necessarily, the subject may be a person who is executing some position and/or motion. However, subjects may also include (but are not limited to) others such as instructors, evaluators, medical personnel, etc.

The present invention also is not particularly limited with regard to how world data is established 108. For example, world data may be established 108 by being sensed using one or more sensors. As a more concrete example, an imaging sensor, depth sensor, etc. may be used to determine the position of the entity in question, the motion of the entity, etc., with that real-world position and motion information then being used as or being used to inform the world data. As an alternative, world data may be received from some external system, e.g. via wired or wireless communication. As another alternative, world data may be read from data storage, for example memory in a processor itself or some distinct data store such as a hard drive, solid state drive, etc. As yet another alternative, world data may be generated, e.g. within a processor. An example of the latter arrangement might include a situation wherein the entity in question is a virtual or augmented reality entity, and the processor in question is generating and/or updating that entity (thus, the processor might be presumed "know" the position and/or motion of the entity that the processor is generating).

The present invention furthermore is not particularly limited with regard to the form or content of the world data. World data may describe the entity and/or the environment of the entity in substantially any fashion. World data may be static and/or dynamic, and may include, but is not limited to, mathematical information, coordinates, one-, two-, three-, and/or higher-dimensional geometric constructs, images, video, audio, text, and models such as a model of the entity in question. World data may vary considerably within such examples (which are not themselves exhaustive). For example, considering geometric constructs, world data may include points such as points of contact, e.g. between points on an entity, points on a subject, points of contact between an entity and a subject (as a more particular example, between a hand and some held device), etc. Other geometric constructs might include vectors or paths of motion, start marks, midway marks, and/or stop marks, boundary marks (e.g. "do not move past this point"), etc.

World data is not limited only to information that directly describes position and/or motion of an entity. For example, world data may include information such as the mass of an entity, the color of an entity, the air resistance of an entity (which may in turn include or reflect information regarding ambient environmental conditions such as air temperature), etc. Other data also may be equally suitable.

Continuing in FIG. 1, target data is established 110. Target data at least substantially represents a desired or target position and/or target motion for an entity. Again for kinesiology applications, target data may include some desired position and/or motion for a human subject, or some portion of the subject's body. As contrasted with world data, which represents real-world positions and/or motions, target data might be understood as representing goals or standards for positions and/or motions.

Typically, though not necessarily, the target data is established 110 in a data processor, such as a processor in a personal computer, smart phone, head mounted display, etc.

As already described with regard to world data, the present invention is not particularly limited regarding what subjects and/or entities may be considered for target data, how target data may be established, or the form and content of target data. For example, target data may be static and/or dynamic, and may include but is not limited to mathematical information, coordinates, one-, two-, three-, and/or higher-dimensional geometric constructs, points of contact, vectors or directional arrows, images, video, audio, text, and models such as a model of the entity in question.

However, it is noted that typically though not necessarily, target data may be established 110 in advance of a desired position and/or motion that is to be represented thereby. Considering physical therapy of a subject's hand as an example, positions and/or motions for the subject's hand may be partially or entirely pre-determined, e.g. being specified by knowledgeable medical personnel in order to achieve some therapeutic end. However, such an arrangement is an example only, and other arrangements may be equally suitable.

Moving on in FIG. 1, guide data is established 112. Guide data at least substantially represents guidance on changing the position and/or motion of an entity as represented by world data to conform with the position and/or motion of the entity as represented by target data. Thus, if world data is the reality, and target data is the goal, guide data may represent instructions for reaching that goal.

As has been described with regard to world data and target data, the present invention is not particularly limited with regard to what subjects and/or entities may be considered, how guide data may be established, or the form and content of guide data. Guide data may be static and/or dynamic, and may include, but is not limited to, mathematical information, coordinates, one-, two-, three-, and/or higher-dimensional geometric constructs, images, video, audio, text, and models such as a model of the entity in question. However, it is noted that typically though not necessarily, guide data may be situation-specific, that is, guide data may consider and/or depend on either or both of the world data and the target data. To continue the example of physical therapy for a subject's hand, the guide data may consider the actual position and/or motion of the hand (world data) in conjunction with the desired position and/or motion of the hand (target data) in establishing the guide data 112. Put another way, guide data is not necessarily limited to static, predetermined guidance for executing a position or motion, but may be tailored specifically to a particular subject, time, place, etc., so as to provide tailored guidance to a subject in executing the relevant position or motion. As a more concrete example, guide data may consider world data such as the position of the subject's hand, the current level of mobility of individual joints thereof, etc., and/or target data such as motions designed for a particular user's medical status (e.g. recovering from carpal tunnel surgery). World data and/or target data likewise may be tailored to subjects and/or circumstances.

With regard to form and content of guide data, it is noted that guide data typically though not necessarily will have a form dictated at least in part by the manner by which the guide data is to be outputted (below). For example, visual guide data might include points of contact, path information such as vectors or directional arrows, outlines of subject and/or entity and/or portions thereof, models (including but not limited to 2D and 3D models) that enclose and/or are coincident some or all of the subject and/or entity, etc.

It is noted that, although different data groups are referred to herein—e.g. world data, target data, guide data, evaluation data (described subsequently herein)—this does not imply that such data groups are or necessarily must be different in content. For example, for certain embodiments of the present invention target data and guide data might be identical. That is, the guide data that is to be outputted to a subject to guide a position or motion might be the same as the target data considered as the ideal for that position or motion, etc. Other similarities or equivalencies between data groups also may exist, and though not required are not prohibited.

Continuing in FIG. 1, the guide data is outputted 116 to a subject. Typically though not necessarily, the guide data will be outputted visually, for example to a display for a personal computer, smart phone, head mounted display, etc. However other arrangements may be equally suitable. The manner by which the guide data is outputted is not particularly limited, however as noted above the manner by which guide data is to be outputted may influence to at least some degree the form and/or content of the guide data (i.e., an audio output might be well-suited to audio guide data), and/or vice versa.

Although FIG. 1 shows the method as being complete once the guide data is outputted 116, this is an example only. Other steps, including but not limited to repetition of steps already described, may also be executed.

For example, it will be understood that the arrangement shown in FIG. 1 is essentially static in nature. That is, world data is established 108, target data is established 110, guide data is established 112, the guide data is outputted 116, and the method concludes. As a more concrete example, a subject's hand position is determined (once), a desired hand position is identified (once), guidance to show the proper position is generated and outputted to the subject (also once).

However, the present invention is not limited only to static arrangements for position and/or motion instruction. Moving on to FIG. 2, therein is shown an example embodiment of a method for position/motion instruction in accordance with the present invention, incorporating dynamic updating therein.

Figure 2:
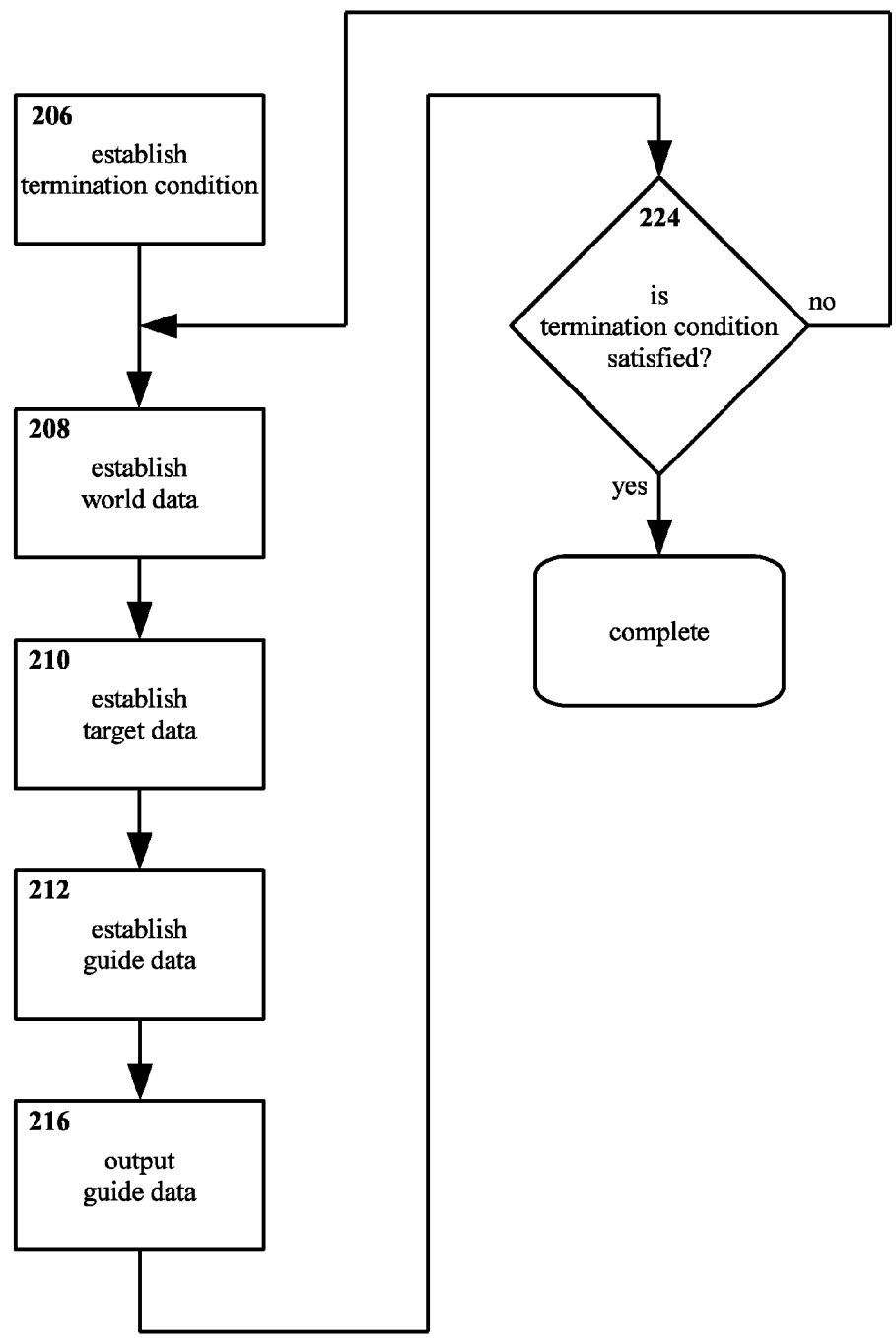
FIG. 2 illustrates an example embodiment of a method for position and/or motion instruction according to the present invention, including dynamic updating.

In the method shown in FIG. 2, a termination condition is established 206. As described below, the method therein repeats until some condition, referred to herein as a termination condition, is satisfied, at which point the method terminates. Thus the termination condition defines what is to happen for the method of position/motion instruction to be complete.

As already described with regard to world data, target data, and guide data, the present invention is not particularly limited with regard to how the termination condition is established 206. Similarly, the present invention is not particularly limited insofar as what may serve as a termination condition.

For example, for certain embodiments time may be used as a termination condition. That is, when some period of time has elapsed the termination condition is satisfied (and thus the method of FIG. 2 repeats as shown therein until that period of time has elapsed). Alternately, some absolute time might be used as a termination condition, e.g. 3:30 PM (at which point the method of FIG. 2 terminates).

As an alternative, some number of cycles of the method may be utilized, for example as a counter. Thus, the method might operate for 1,000 cycles (possibly though not necessarily relating to the clock cycles of a controlling processor) before terminating.

As another alternative, the termination condition might be based on whether the position and/or motion in question is executed. This might be accomplished for example by considering whether the world data matches the target data. That is, considering a physical therapy hand position as target data, when the world data for the subject's hand matches the target data (perhaps to within some margin), it may be considered that the position has been executed, at which point the termination condition may be satisfied and the method then terminates.

The preceding are examples only, and other arrangements for termination conditions may be equally suitable.

Continuing in FIG. 2, world data is established 208, target data is established 210, and guide data is established 212. Guide data is outputted 216. These steps are at least somewhat similar to corresponding steps already described with regard to FIG. 1.

However, in the arrangement of FIG. 2, as alluded to above a determination is made 224 regarding whether the termination condition is satisfied. If the termination condition is not satisfied, the method then repeats from step 208. If the termination condition is satisfied, the method is complete.

Although certain steps of the method shown in FIG. 2 may be repeated, it is not necessarily required that new results for those steps necessarily will be produced. For example, if the world data has not changed between one repetition and another, the world data established in step 208 in one repetition may be substantially identical or even entirely identical to the world data established in step 208 in another repetition. Similarly, target data and guide data will not necessarily change when established 210 and 212 from one repetition to another.

However, although world data, target data, guide data, etc. is not required to change when established 208, 210, 212, etc. in multiple cycles, neither is such change prohibited. Indeed, changes in one or more of world data, target data, and guide data (and also evaluation data, described below) may enable useful features of the present invention.

Notably, in establishing world data 208 in each cycle, world data may be dynamically updated in each cycle. For example, for a subject manipulating some entity toward a position or in a motion, the actual position, orientation, speed, path, etc. for the entity—world data—may be updated over time. Using as an example hand motions, as the subject moves his or her hand over time, the world data describing hand position and hand motion is updated over time. World data thus is not necessarily static or fixed, but rather may be dynamically updated.

Similarly, target data may be dynamically updated. While for at least certain embodiments a target position or motion may be essentially fixed for the execution of that position or motion, this is not required. To continue the hand motion example above, for at least certain embodiments the targets for where and how a subject is to move his or her hand may change dynamically depending on the position and motion of the subject's hand from one moment to another. For example, if actual positions and/or motions (world data) for a subject's hand indicate that the subject has limited range of motion, experiences pain from certain positions and/or motions, has higher-than-average flexibility, etc., then the target data might be adjusted in response, e.g. a target position might be made less complex, a target motion might be made slower, etc. Put another way, if the subject has difficulty performing a motion, the motion might be modified so as to be less difficult for the subject. Examples wherein such dynamic updating of target data might be useful include, but are not limited to, physical therapy, athletic training, instruction in playing a musical instrument, etc.

Likewise, guide data may be dynamically updated. Even if target data remains unchanged, as a subject proceeds to execute a position and/or motion, if the world data is changing—for example, if the subject has begun to move toward the position and/or initiated the motion—then the degree and direction of change in position, motion, etc. that is required of the subject may change. More concretely, if a subject is to execute a golf swing, when the subject is halfway through the swing the amount and direction of motion that is yet to be executed is different than when the subject is just beginning the swing. Guide data may be dynamically updated for example to reflect the current difference between world data and target data, so that the guide data presented to the subject is up-to-date. Furthermore, if the subject deviates from a planned position or motion, guide data may be dynamically updated to show the subject how to correct the position or motion.

It is noted that even in embodiments that include dynamic updating of world data, target data, and/or guide data, it is not necessary to update each of world data, target data, and guide data. That is, target data might be updated without updating world data, guide data might be updated without updating target data, etc. Additionally, it is not necessary for all embodiments to update all of any or all such types of data, e.g. none, some, or all of guide data might be dynamically updated, some, none, or all of target data may be dynamically updated, some, none, or all of world data may be updated, etc.

Figure 3:
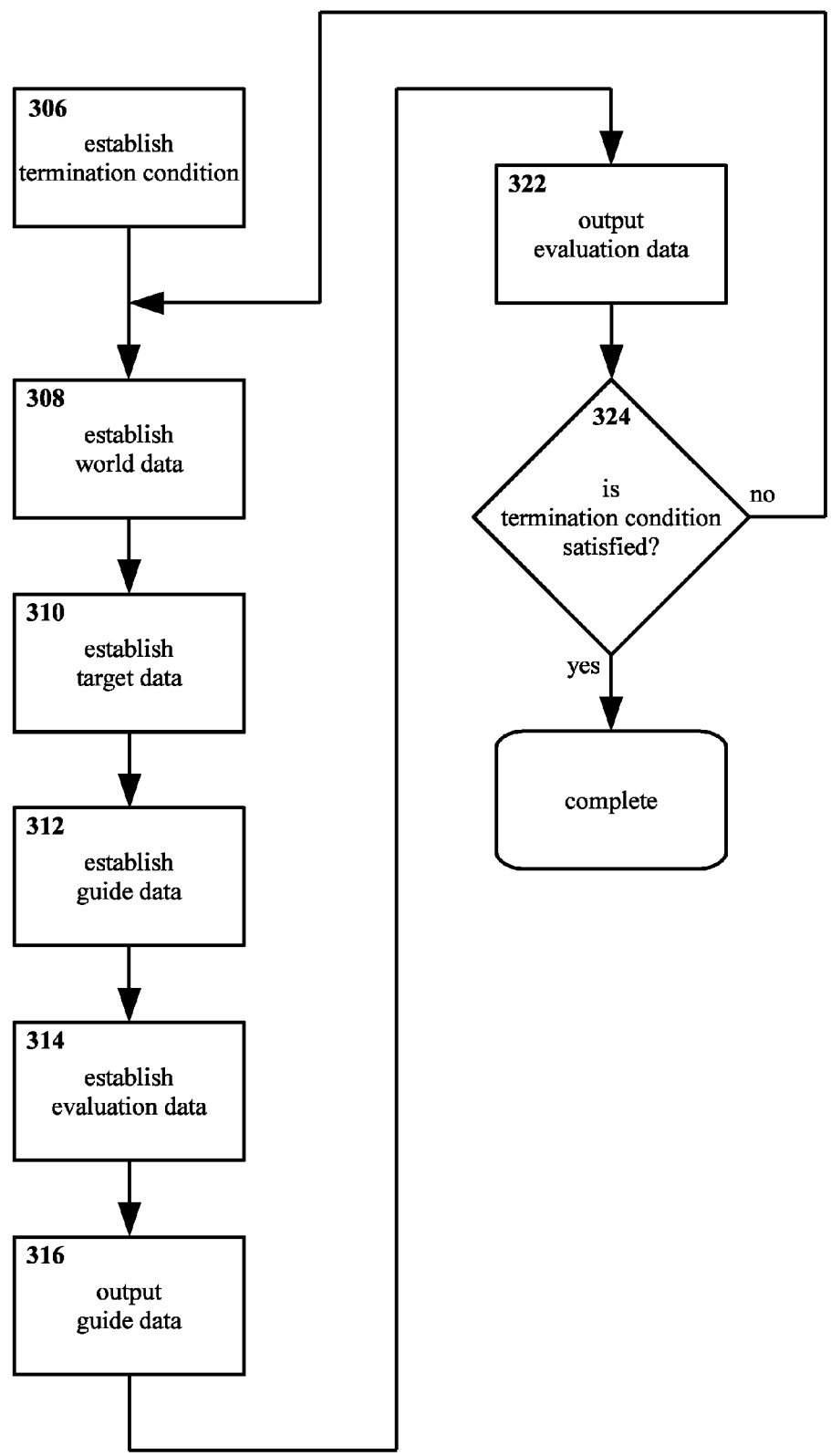
FIG. 3 illustrates an example embodiment of a method for position and/or motion instruction according to the present invention, including evaluation of the position and/or motion.

Turning now to FIG. 3, therein is shown an example embodiment of a method for position/motion instruction in accordance with the present invention, incorporating dynamic updating therein, including evaluation of the position and/or motion.

In the arrangement of FIG. 3, a termination condition is established 306. World data is established 308, target data is established 310, and guide data is established 312. These steps are at least somewhat similar to corresponding steps described with regard to FIG. 2.

Continuing in FIG. 3, evaluation data is established 314. Evaluation data at least substantially represents a degree to which the position and/or motion being instructed is successfully conveyed to the subject who is to execute the position and/or motion. For example, continuing the example of hand positions for physical therapy, evaluation data might include some comparison of world data (the actual position of the subject's hand) against target data (the position into which the subject is to place his or her hand), and/or of world data against guide data (the information directing the subject to place his or her hand in some position).

The present invention is not particularly limited with regard to how evaluation data is established 314. Typically, though not necessarily, evaluation data is established through comparison of data already available, e.g. world data against target data and/or guide data as described above, but this is an example only and other arrangements may be equally suitable.

The present invention also is not particularly limited with regard to form and/or content of evaluation data. Evaluation data may include but is not limited to numerical data (e.g. between a world data position and a target data position, between a world data velocity for a motion and a target data velocity for that motion, etc.), tables, charts, images, etc. In addition, evaluation data may include messages, warnings, etc. As more particular examples, evaluation data might include information for a subject regarding common errors in the position or motion, warnings about dangers associated with the position or motion, an instruction to cease executing the position or motion if the user makes some serious or dangerous error, an overall judgment regarding the execution of one or more positions and/or motions (e.g. "complete", "successful", "excellent", "improved over previous set", etc.).

Still with reference to FIG. 3, guide data is outputted 316. This step is at least somewhat similar to the corresponding step already described with regard to FIG. 2.

Evaluation data also may be outputted 322. As previously noted, evaluation data at least substantially represents a degree to which the position and/or motion being instructed is successfully conveyed to the subject who is to execute the position and/or motion, and may include comparisons of an actual position/motion (world data) against a planned position/motion (target data), etc. In step 322, some or all of the evaluation data established in step 314 may be outputted, e.g. to the subject executing the position/motion.

Outputting evaluation data 322 is an optional step, as may be understood for example by noting that no analog to outputting evaluation data 322 appears in FIG. 1 or FIG. 2. (Likewise establishing evaluation data 314 is optional.) However, even for embodiments wherein evaluation data is established 314, it is not required to output all or even any of the evaluation data 322 that was so established 314. That is, evaluation data may be established 314 without any of the evaluation data being outputted 322, or with only some of the evaluation data being outputted 322.

In addition, as has been noted with regard to world data, target data, and guide data, evaluation data may be dynamically updated, e.g. from one repetition to another. Thus, as a subject executes a position and/or a motion, an evaluation therefor may be established and/or outputted, reflecting changes in position and/or motion dynamically as those changes occur.

Moving on in FIG. 3, a determination is made 324 as to whether the termination condition is satisfied. If the termination condition is not satisfied, the method then repeats from step 308. If the termination condition is satisfied, the method is complete.

Figure 4:
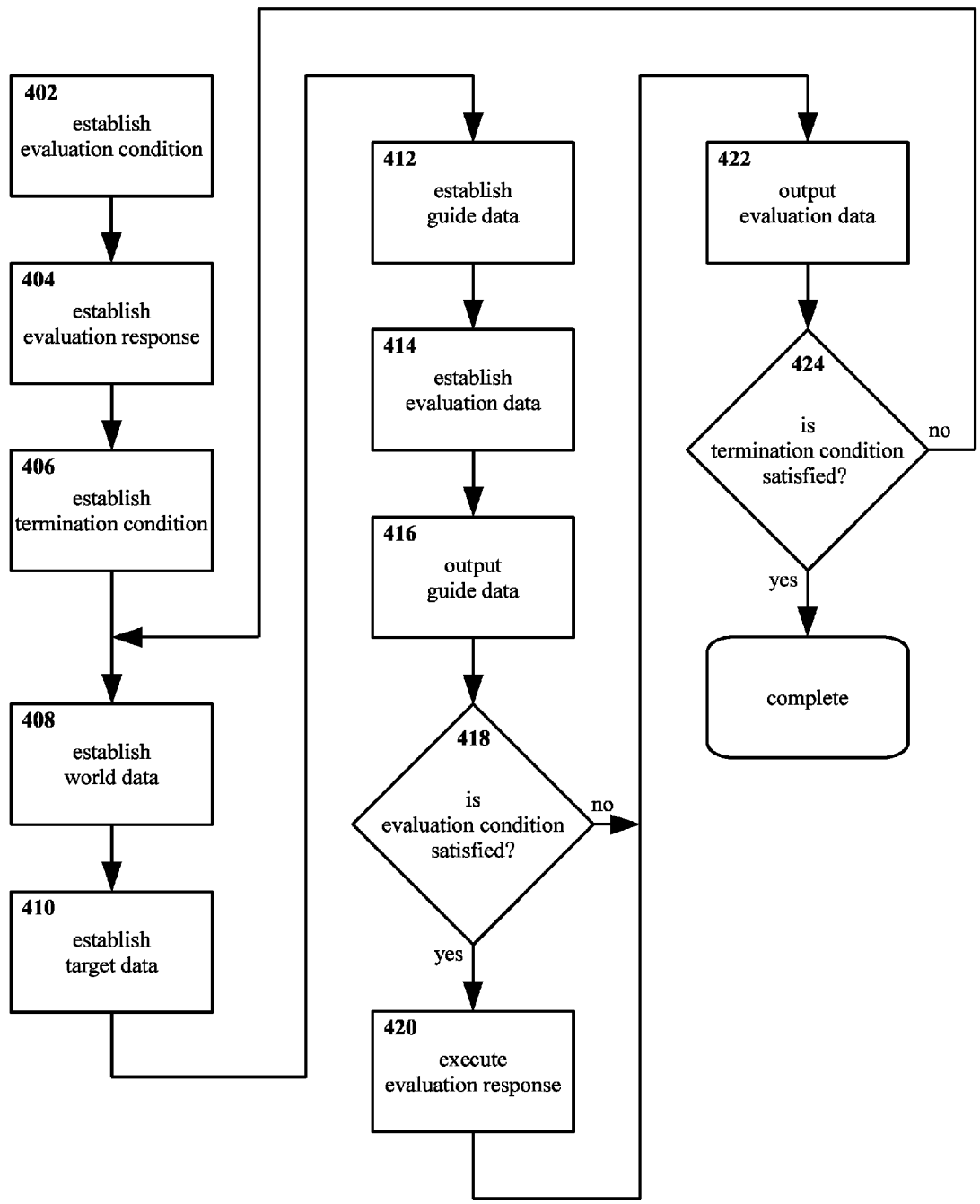
FIG. 4 illustrates an example embodiment of a method for position and/or motion instruction according to the present invention, including an evaluation response.

Turning now to FIG. 4, therein is shown an example embodiment of a method for position/motion instruction in accordance with the present invention, incorporating dynamic updating therein, including evaluation of the position and/or motion. In addition, as shown in FIG. 4 the evaluation data may include an evaluation condition and/or a response thereto.

In the example method of FIG. 4, an evaluation condition is established 402. The evaluation condition is some state of evaluation of position and/or motion, and/or the instructions therefor. That is, an evaluation condition might be "position is executed correctly", "motion has been completed", "motion is interrupted", etc. Although for clarity example evaluation conditions above are presented as textual descriptions, an evaluation condition might be expressed graphically, numerically, etc., for example "speed exceeds 15 mph" or "entity no longer sensed" (e.g. if the entity has been moved out of the field of view of one or more sensors). These are examples only, and other arrangements may be equally suitable.

As noted above with regard to world data, target data, etc., the present invention is not particularly limited with regard to how an evaluation condition may be established, the form or content of an evaluation condition, etc.

Continuing in FIG. 4, an evaluation response is established 404. The evaluation response is some event or action that is to take place if the evaluation condition is satisfied. To continue one example above, an evaluation response might be "display 'out of field' message to subject" if the entity is no longer sensed. In addition, evaluation responses are not limited only to delivering information. An evaluation response might turn some system or device on or off, trigger a subroutine (e.g. a remedial training program, or one more advanced), etc. These are examples only, and other arrangements may be equally suitable.

Again as already noted with regard to world data, target data, etc., the present invention is not particularly limited with regard to how an evaluation response may be established, the form or content of an evaluation response, etc.

Still with reference to FIG. 4, a termination condition is established 406. World data, target data, guide data, and evaluation data are established 408, 410, 412, and 414. Guide data is outputted 416. A determination is made as to whether the evaluation condition is satisfied. If the determination is negative—if the evaluation condition is not met—the method proceeds to step 422 (below). If the determination is positive—if the evaluation condition is met—the evaluation response is executed 420. In step 422, the evaluation data is outputted 422.

A determination is made 424 as to whether the termination condition is satisfied. If the termination condition is not satisfied, the method returns to step 408. If the termination condition is satisfied, the method is complete.

As has been noted with regard to FIG. 3, outputting evaluation data is optional. Furthermore, although FIG. 4 shows both execution of an evaluation response 420 and output of evaluation data 422, it is not required to include both steps. For example, as is visible in FIG. 3 evaluation data may be outputted 322 without executing an evaluation response (or necessarily even having provision for an evaluation response). Conversely, an embodiment of the present invention might include provision for an evaluation response without outputting evaluation data.

Figure 5:
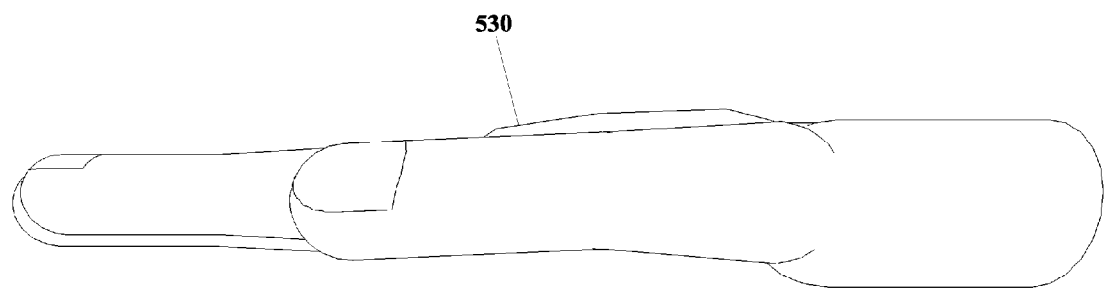
FIG. 5 through FIG. 9 illustrate world data for example positions and/or motions for a hand as might be instructed according to the present invention, as might relate to physical therapy.

Turning now to FIG. 5, therein and in certain subsequent illustrations examples of world data, target data, and guide data are shown.

In FIG. 5, a side-view image of a human hand representing world data 530 is shown therein. As has been previously stated, world data 530 may include images and/or models of entities, and such entities may include but are not limited to a human hand. Typically, though not necessarily, world data 530 may be displayed to a subject substantially as the entity in question would appear with the naked eye, thus for the example of FIG. 5 the world data 530 will at least substantially represent an actual hand in an actual position. When displayed, world data may be displayed actively, for example being generated as an image in an LED display, etc., and/or may be displayed passively, for example being passed through a transparent or semi-transparent display, etc. However, it is emphasized that world data is not required to be displayed (either actively or passively), nor is world data required to appear substantially as the entity, and other arrangements may be equally suitable.

Nevertheless, for clarity in FIG. 5 (and certain subsequent illustrations herein) the world data 530 is presented as a realistic image of the entity in question, namely the subject's hand. Thus, reference number 530 might likewise be considered to refer to the entity (hand) itself, and/or to the subject (whose hand the entity is) himself or herself.

As may be seen in FIG. 5, the hand shown as a world data 530 is in a position wherein the fingers and thumb are substantially extended, with the wrist substantially straight and the palm facing substantially downward.

Figure 6:
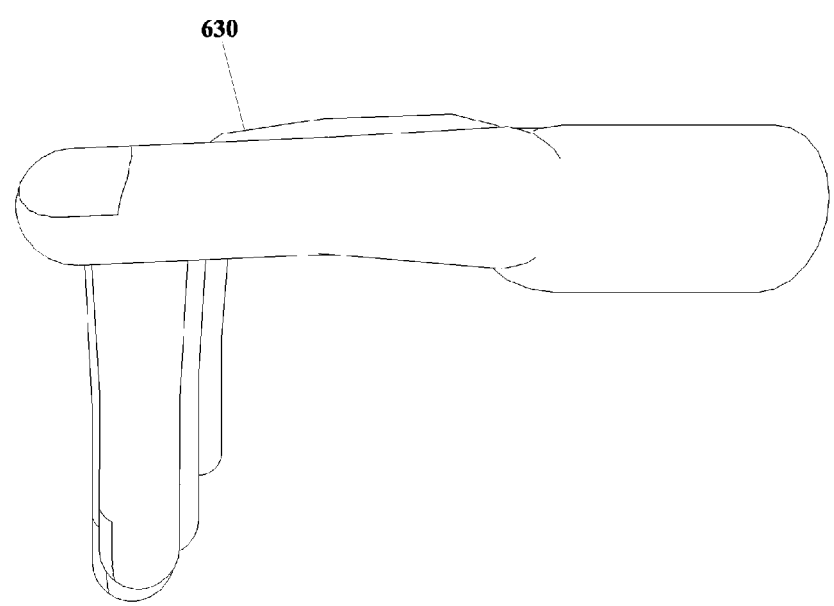

Moving on to FIG. 6, another arrangement of world data 630 is shown. Therein, the fingers are flexed approximately 90 degrees at the first knuckle but substantially extended at the second and third knuckles, while the thumb remains substantially extended.

Figure 7:
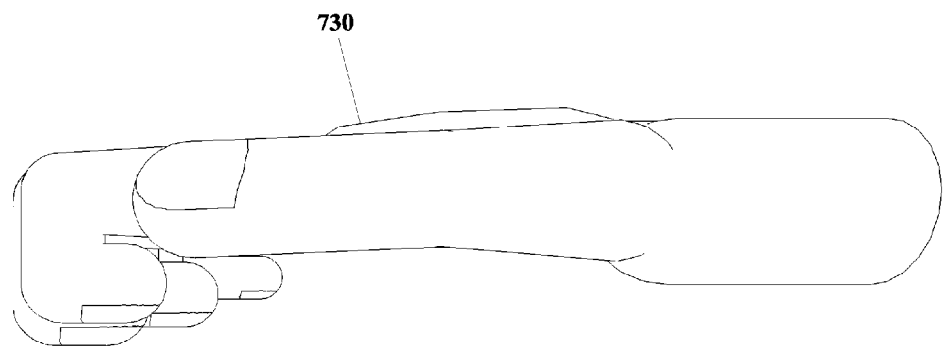

Continuing with FIG. 7, another arrangement of world data 730 is shown. Therein the fingers are substantially extended at the first knuckle, but are flexed approximately 90 degrees at each of the second and third knuckles, with the thumb substantially extended.

Figure 8:
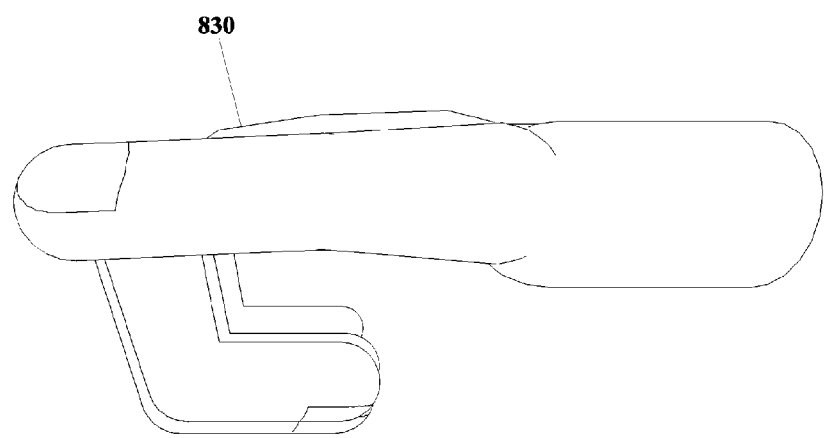

Now with reference to FIG. 8, yet another arrangement of world data 830 is shown. Therein the fingers are flexed approximately 105 degrees at the first knuckle, are flexed approximately 75 degrees at the second knuckle, and are substantially extended at the third knuckle, with the thumb substantially extended.

Figure 9:
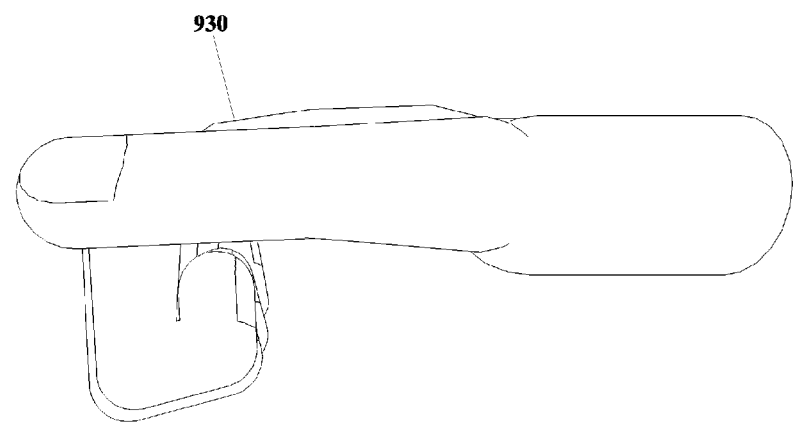

With reference to FIG. 9, still another arrangement of world data 930 is shown. Therein the fingers are flexed approximately 90 degrees at the first knuckle, are flexed approximately 105 degrees at the second knuckle, and are flexed approximately 75 degrees at the third knuckle, with the thumb substantially extended.

While individually each of FIG. 5 through FIG. 9 shows a position for an entity, in particular a human hand, it will be understood that taken collectively as a sequence FIG. 5 through FIG. 9 may be taken to represent a motion sequence for the hand. More broadly, any two or more of the positions shown in FIG. 5 through FIG. 9 may be taken to represent a motion sequence, i.e. from one position to another. Furthermore, a single position also may be taken as a start, middle, or end of some motion. Thus although FIG. 5 through FIG. 9 are necessarily illustrated statically herein, it will be understood that any or all of FIG. 5 through FIG. 9 may also represent world data for motion, not just for position.

It is noted that the particular sequence of positions represented by FIG. 5 through FIG. 9 is at least substantially representative of a sequence of hand exercises as might be prescribed therapeutically, e.g. for prevention and/or treatment of carpal tunnel syndrome. Such positions and/or motions might thus for example be considered to be associated with physical therapy, physical training, medical training, medical treatment, medical diagnostics, etc., and/or the world data 530 through 930 may be considered representative thereof.

Figure 10:
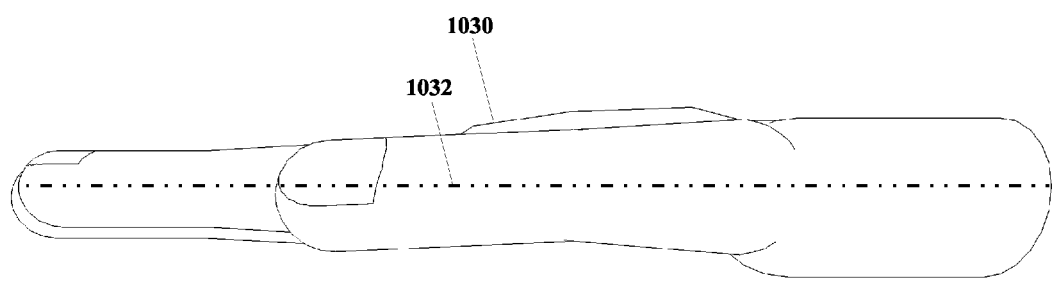
FIG. 10 and FIG. 10A through FIG. 14 illustrate world data and target data for example positions and/or motions as might be instructed according to the present invention, corresponding with FIG. 5 through FIG. 9.

Now with reference to FIG. 10, world data 1030 at least somewhat similar to that in FIG. 5 is shown therein. However, FIG. 10 also shows target data 1032 in the form of a double-dot/single-dash line extending through the wrist, the thumb, and the fingers (collectively) representing targets for wrists, thumb, and fingers respectively. That is, the target data 1032 shows the desired position for the hand, and thus the desired state for the world data 1030.

Although for clarity the world data 1030 is shown to be in the desired state as established by the target data 1032, it will be understood that in practice world data 1030 will not necessarily match target data 1032 at all times (nor will world data necessarily ever match target data in at least certain instances). It may be desirable for a subject to manipulate an entity—in the example of FIG. 10, a hand—so that the hand (and thus world data 1030 representative thereof) takes a position or makes a motion that does match the target data 1032, at least insofar as successfully instructing the subject in executing the target motion or target position. However, deviations may exist, for example if the subject has not begun or has not completed a target motion, if the subject does not perfectly execute a target position, etc. Nevertheless, for clarity the world data 1030 and target data 1032 are shown as being aligned.

It is emphasized that target data 1032 is not required to be visible to a subject, and for many embodiments may not be visible. Furthermore, even if target data 1032 is visible, target data 1032 will not necessarily be overlaid onto world data 1030, nor will target data 1032 necessarily be of the form shown in FIG. 10. However, again for clarity, target data 1032 is shown in a simple line/joint form, and is overlaid onto world data 1030.

In FIG. 10, the target data 1032 indicates a position wherein the fingers and thumb are to be substantially extended, with the wrist substantially straight and the palm facing substantially downward. The world data 1030 is shown as conforming to the target data.

Figure 11:
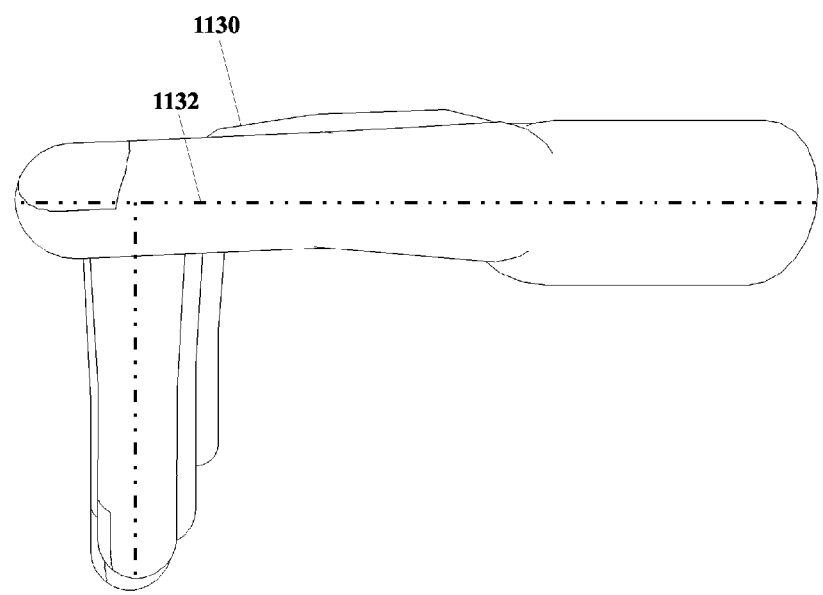

Moving on to FIG. 11, another arrangement of target data 1132 is shown. Therein, the fingers are to be flexed approximately 90 degrees at the first knuckle but substantially extended at the second and third knuckles, while the thumb is to be substantially extended. World data 1130 also is shown conforming to the target data.

Figure 12:
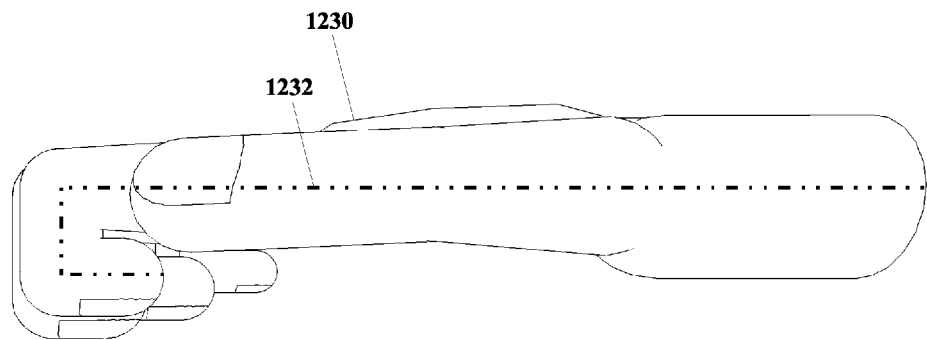

Continuing with FIG. 12, another arrangement of target data 1232 is shown. Therein the fingers are to be substantially extended at the first knuckle, but are to be flexed approximately 90 degrees at each of the second and third knuckles, with the thumb to be substantially extended. World data 1230 also is shown conforming to the target data.

Figure 13:
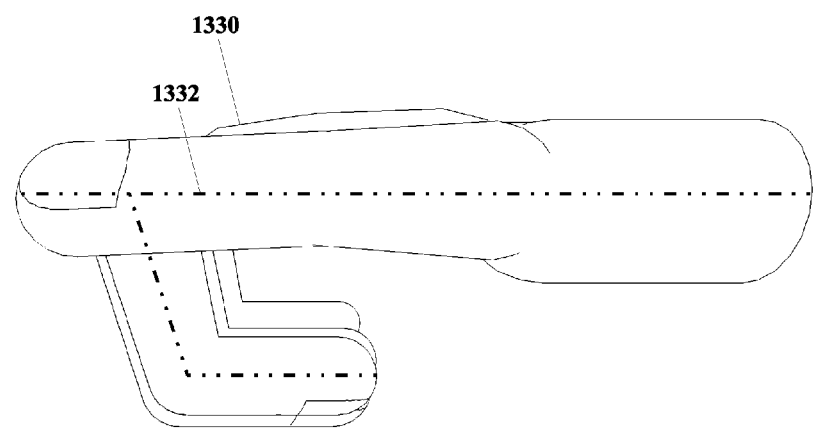

Now with reference to FIG. 13, yet another arrangement of target data 1332 is shown. Therein the fingers are to be flexed approximately 105 degrees at the first knuckle, are to be flexed approximately 75 degrees at the second knuckle, and are to be substantially extended at the third knuckle, with the thumb to be substantially extended. World data 1330 also is shown conforming to the target data.

Figure 14:
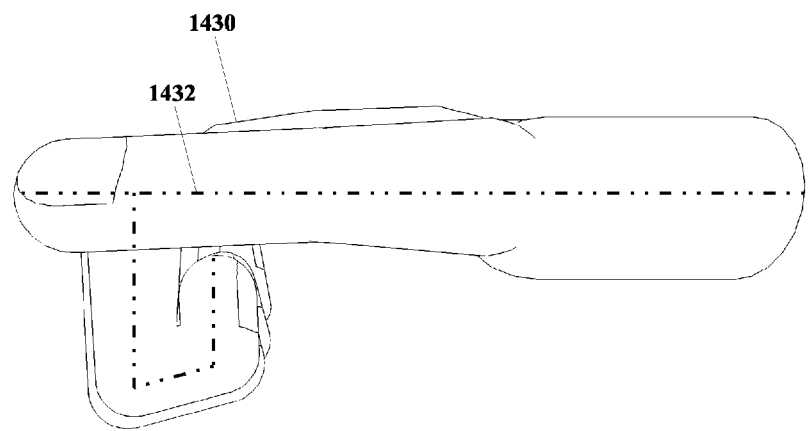

With reference to FIG. 14, still another arrangement of target data 1432 is shown. Therein the fingers are to be flexed approximately 90 degrees at the first knuckle, are to be flexed approximately 105 degrees at the second knuckle, and are to be flexed approximately 75 degrees at the third knuckle, with the thumb to be substantially extended. World data 1430 also is shown conforming to the target data.

While individually each of FIG. 10 through FIG. 14 shows a target position for an entity, in particular a human hand, it will be understood that taken collectively as a sequence FIG. 10 through FIG. 14 may be taken to represent a motion sequence for the hand. Likewise, any two or more of the positions shown in FIG. 10 through FIG. 14 may be taken to represent a target motion sequence, i.e. from one target position to another. Furthermore, a single target position also may be taken as a start, middle, or end of some target motion. Thus although FIG. 10 through FIG. 14 are necessarily illustrated statically herein, it will be understood that any or all of FIG. 10 through FIG. 14 may also represent world data for motion, not just for position.

Similarly to the arrangement described with regard to FIG. 5 through FIG. 9, the particular sequence of target positions represented by FIG. 10 through FIG. 14 is at least substantially representative of a sequence of hand exercises as might be prescribed therapeutically, e.g. for prevention and/or treatment of carpal tunnel syndrome. Such target positions and/or motions might thus for example be considered to be associated with physical therapy, physical training, medical training, medical treatment, medical diagnostics, etc., and/or the target data 1032 through 1432 may be considered representative thereof.

Figure 15:
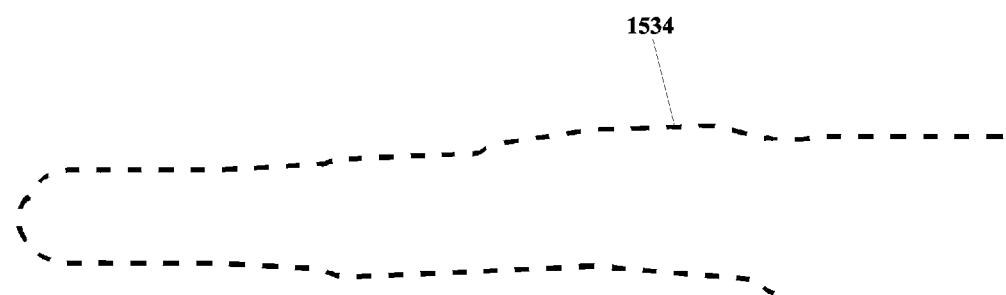
FIG. 15 through FIG. 19 illustrate guide data for example positions and/or motions as might be instructed according to the present invention, corresponding with FIG. 5 through FIG. 9.

Now with reference to FIG. 15, guide data 1534 is shown therein. By comparison with FIG. 5, it will be seen that the guide data 1534 in FIG. 15 is at least somewhat similar to the world data 530 in FIG. 5, at least in that the guide data 1534 in FIG. 15 substantially corresponds to a dashed outline of the world data 530 as shown in FIG. 5. That is, guide data 1534 at least substantially corresponds to a position of a hand wherein the fingers and thumb are substantially extended, with the wrist substantially straight and the palm facing substantially downward, and thus may serve as a guide for a subject in executing such a position.

Figure 16:
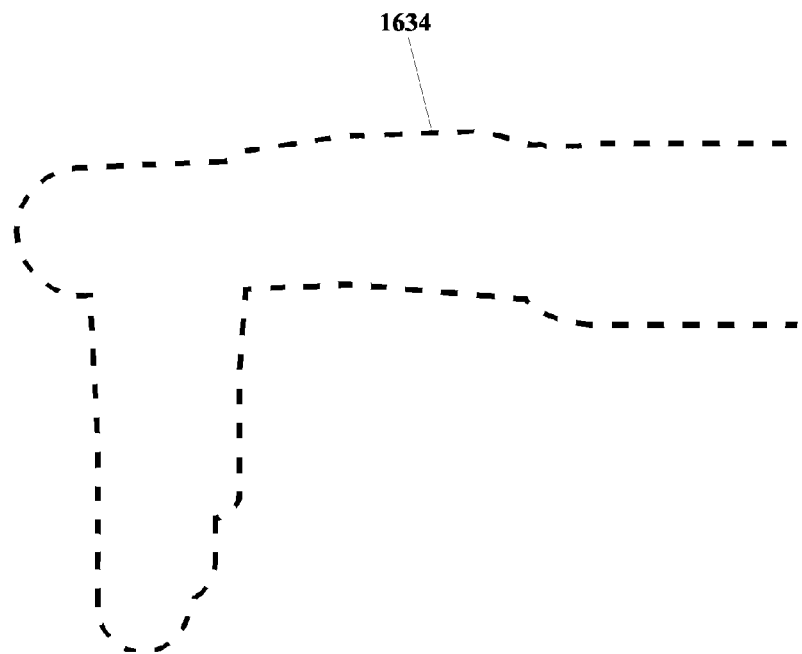

Moving on to FIG. 16, another arrangement of guide data 1634 is shown. Therein, a dashed outline of guide data 1634 at least substantially corresponds to a position of a hand wherein the fingers are flexed approximately 90 degrees at the first knuckle but substantially extended at the second and third knuckles, while the thumb is substantially extended.

Figure 17:
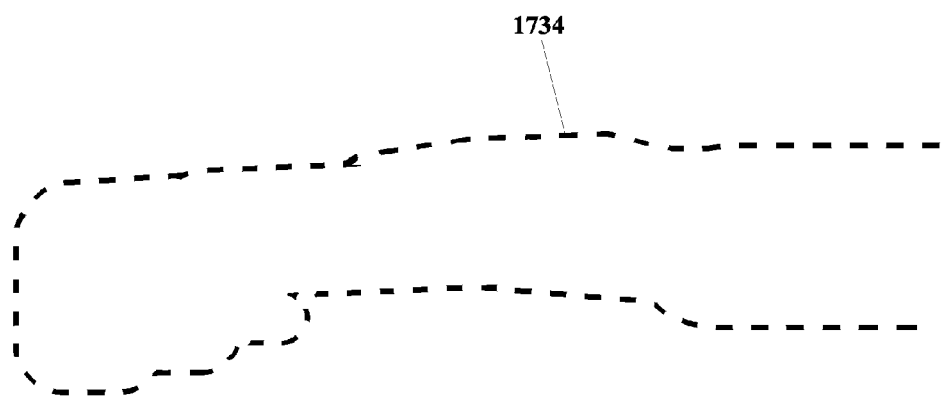

Continuing with FIG. 17, another arrangement of guide data 1734 is shown. A dashed outline of guide data 1734 at least substantially corresponds to a position of a hand where the fingers are to be substantially extended at the first knuckle, but are flexed approximately 90 degrees at each of the second and third knuckles, with the thumb substantially extended.

Figure 18:
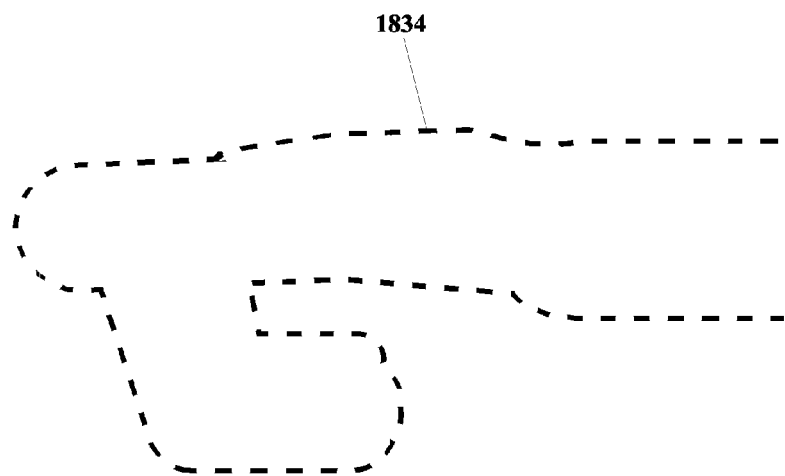

Now with reference to FIG. 18, yet another arrangement of guide data 1834 is shown. Therein, a dashed outline of guide data 1834 at least substantially corresponds to a position of a hand wherein the fingers are flexed approximately 105 degrees at the first knuckle, are flexed approximately 75 degrees at the second knuckle, and are substantially extended at the third knuckle, with the thumb substantially extended.

Figure 19:
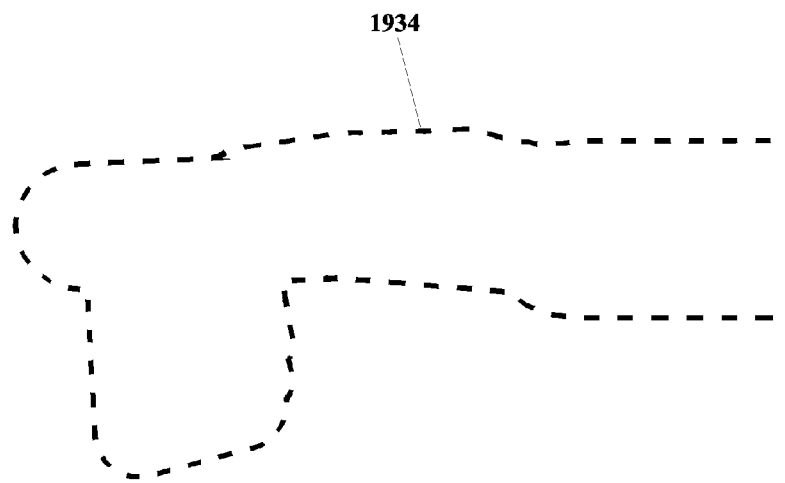

With reference to FIG. 19, still another arrangement of guide data 1934 is shown. Therein, a dashed outline of guide data 1934 at least substantially corresponds to a position of a hand wherein the fingers are flexed approximately 90 degrees at the first knuckle, are flexed approximately 105 degrees at the second knuckle, and are flexed approximately 75 degrees at the third knuckle, with the thumb to be substantially extended.

In FIG. 15 through FIG. 19, guide data 1534 through 1934 is shown alone. Such an arrangement may be suitable for at least certain embodiments. However, in other embodiments guide data may be shown in conjunction with other data, including but not limited to world data. That is, the subject may be provided with (for example) both world data to show the actual position of a relevant entity (world data), in this example a hand, and the desired position of the entity (target data). Such an arrangement may be useful, for example in that showing both the current state and desired state of the entity in question may support improved position and motion control by enabling feedback to the subject.

FIG. 20 through FIG. 24 illustrate an arrangement at least somewhat similar to FIG. 15 through FIG. 19, except that world data also is shown in conjunction with guide data.

Figure 20:
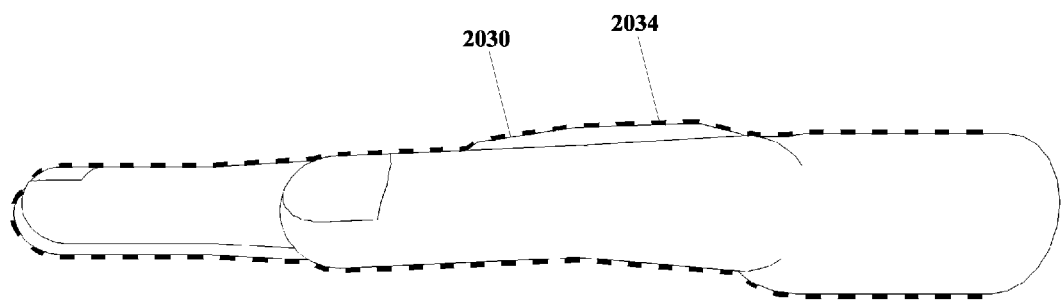
FIG. 20 and FIG. 20A through FIG. 24 illustrate world data and guide data for example positions and/or motions as might be instructed according to the present invention, corresponding with FIG. 5 through FIG. 9.

With reference to FIG. 20, guide data 2034 is shown therein, and world data 2030. As may be seen, world data 2030 at least substantially corresponds to a position of a hand wherein fingers and thumb are substantially extended, with the wrist substantially straight and the palm facing substantially downward, and thus may serve as a guide for a subject in executing such a position; guide data 2034 corresponds to a dashed outline of the world data 2030.

Figure 21:
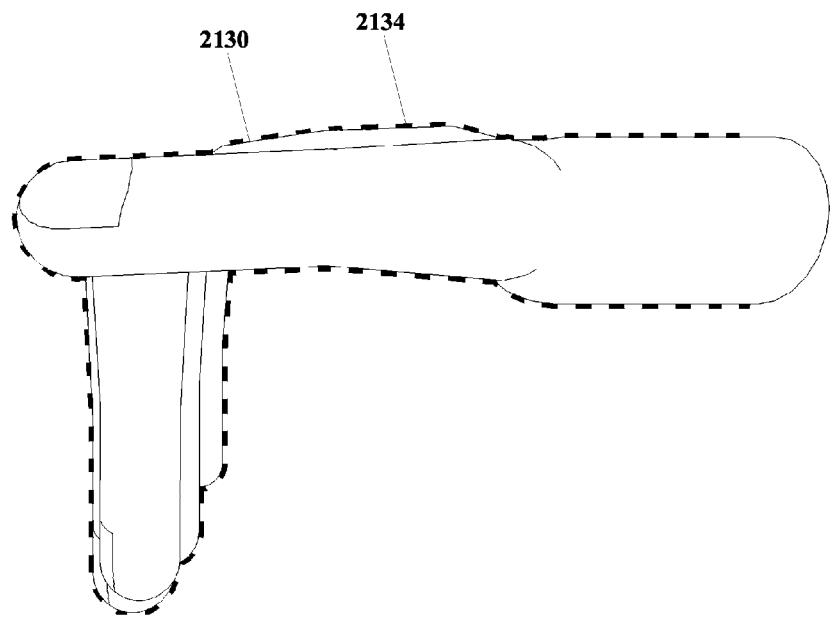

Moving on to FIG. 21, another arrangement of world data 2130 and guide data 2134 is shown. Therein, world data 2130 that at least substantially corresponds to a position of a hand wherein the fingers are flexed approximately 90 degrees at the first knuckle but substantially extended at the second and third knuckles, while the thumb is substantially extended; guide data 2134 corresponds to a dashed outline of the world data 2130.

Figure 22:
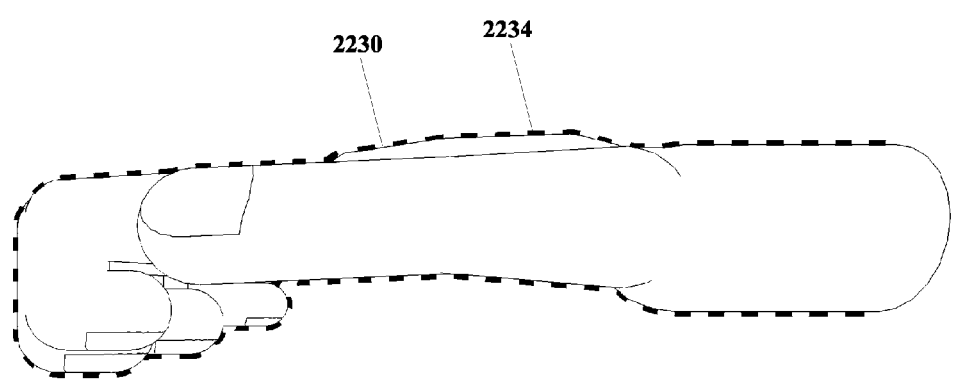

Continuing with FIG. 22, another arrangement of world data 2230 and guide data 2234 is shown. Therein, world data 2230 that at least substantially corresponds to a position of a hand where the fingers are to be substantially extended at the first knuckle, but are flexed approximately 90 degrees at each of the second and third knuckles, with the thumb substantially extended; guide data 2234 corresponds to a dashed outline of the world data 2230.

Figure 23:
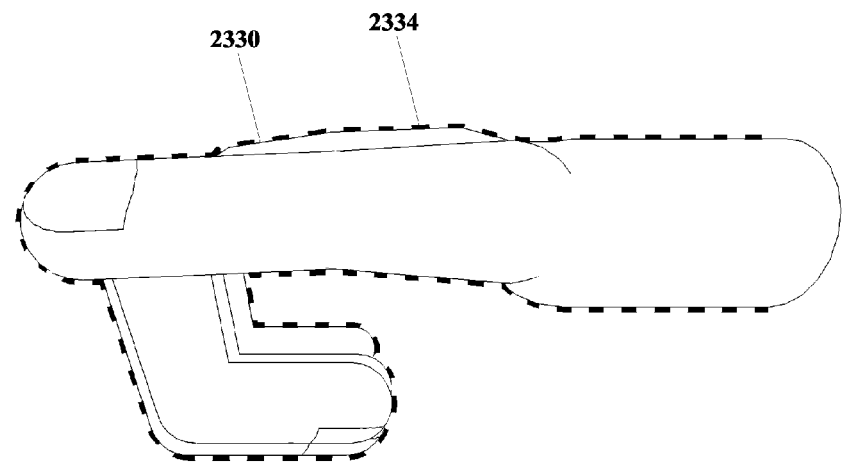

Now with reference to FIG. 23, yet another arrangement of world data 2330 and guide data 2334 is shown. Therein, world data 2330 that at least substantially corresponds to a position of a hand wherein the fingers are flexed approximately 105 degrees at the first knuckle, are flexed approximately 75 degrees at the second knuckle, and are substantially extended at the third knuckle, with the thumb substantially extended; guide data 2334 corresponds to a dashed outline of the world data 2330.

Figure 24:
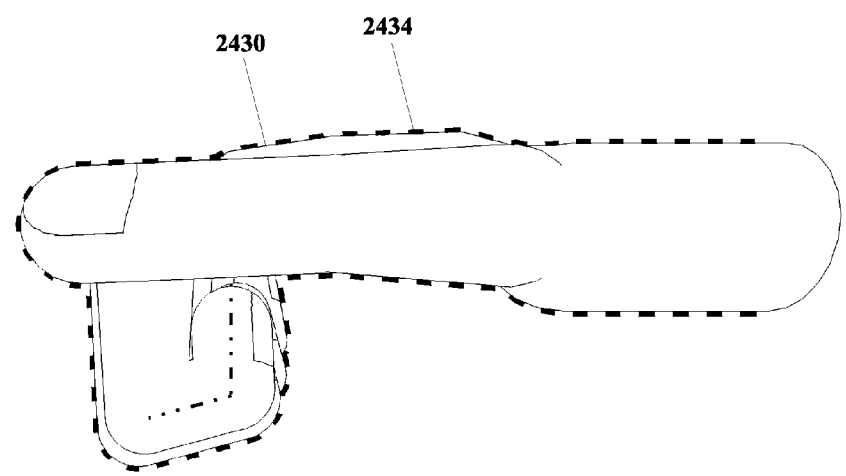

With reference to FIG. 24, still another arrangement of world data 2430 and guide data 2434 is shown. Therein, world data 2430 that at least substantially corresponds to a position of a hand wherein the fingers are flexed approximately 90 degrees at the first knuckle, are flexed approximately 105 degrees at the second knuckle, and are flexed approximately 75 degrees at the third knuckle, with the thumb to be substantially extended; guide data 2434 corresponds to a dashed outline of the world data 2430.

Collectively, FIG. 5 through FIG. 9 may be considered to indicate dynamic updating of world data. That is, as a subject moves his or her hand through a series of positions and/or motions as represented by the world data shown in FIG. 5 through FIG. 9, the world data updates to reflect the changing world positions and/or motions (shown in the successive illustration in the sequence of FIG. 5 through FIG. 9).

Similarly, collectively FIG. 10 through 14 may be considered to indicate dynamic updating of target data. As each position or motion shown in FIG. 10 through FIG. 14 is reached, target data is updated to reflect the changing target positions and/or motions (shown in the successive illustration in the sequence of FIG. 10 through FIG. 14).

Also similarly, collectively FIG. 15 through FIG. 19 and FIG. 20 through FIG. 24 may be considered to indicate dynamic updating of guide data. As each position or motion shown in FIG. 15 through FIG. 19 and FIG. 20 through FIG. 24 is reached, guide data is updated to reflect the changing guide data toward the next target positions and/or motions (shown in the successive illustration in the sequences of FIG. 15 through FIG. 19 and FIG. 20 through FIG. 24).

It will be understood that as static illustrations, FIG. 5 through FIG. 24 can show only individual points in a dynamic sequence. However, dynamic updating may also be understood with reference to FIG. 10A and FIG. 20A.

Figure 10A:
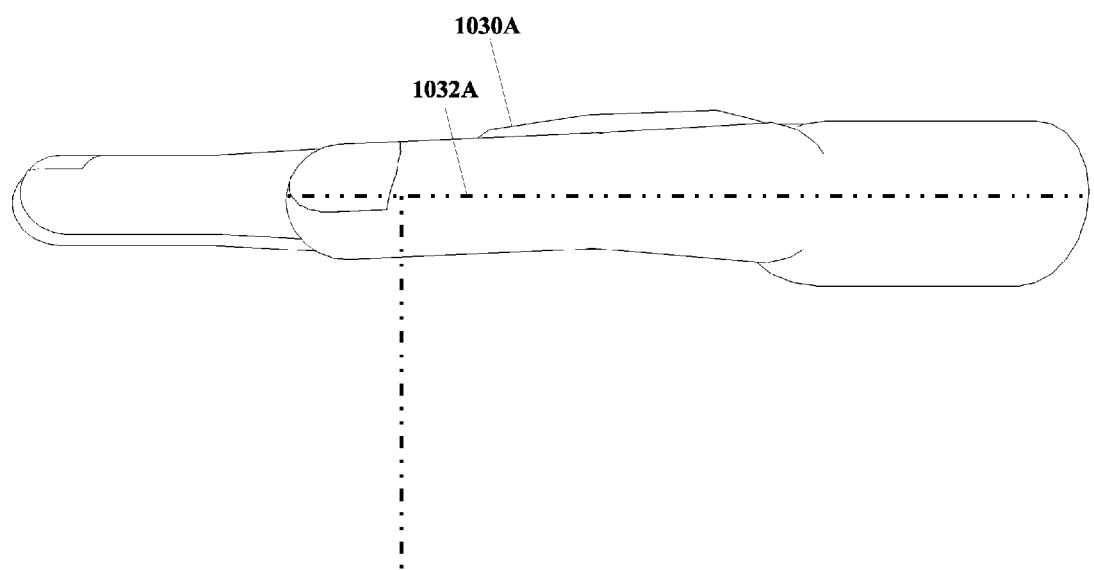

With reference now to FIG. 10A, therein may be seen world data 1030A representing a hand. The configuration of world data 1030A in FIG. 10A may be seen to be at least somewhat similar to the world data 1030 in FIG. 10. FIG. 10A also includes target data 1032A representing a target position and/or motion for the hand. The target data 1032A may be seen to be at least somewhat similar to the target data 1132 in FIG. 11. Thus, FIG. 10A may be considered to represent an intermediate state between FIG. 10 and FIG. 11, wherein the target data 1032A has been dynamically updated but before the hand and the world data 1030A for the hand has executed the new position and/or motion. In such configuration, some circumstance—e.g. executing the position/motion for FIG. 10—has prompted the target data 1032A to update from the target data 1032 shown in FIG. 10 to the target data 1132 shown in FIG. 11.

Figure 20A:
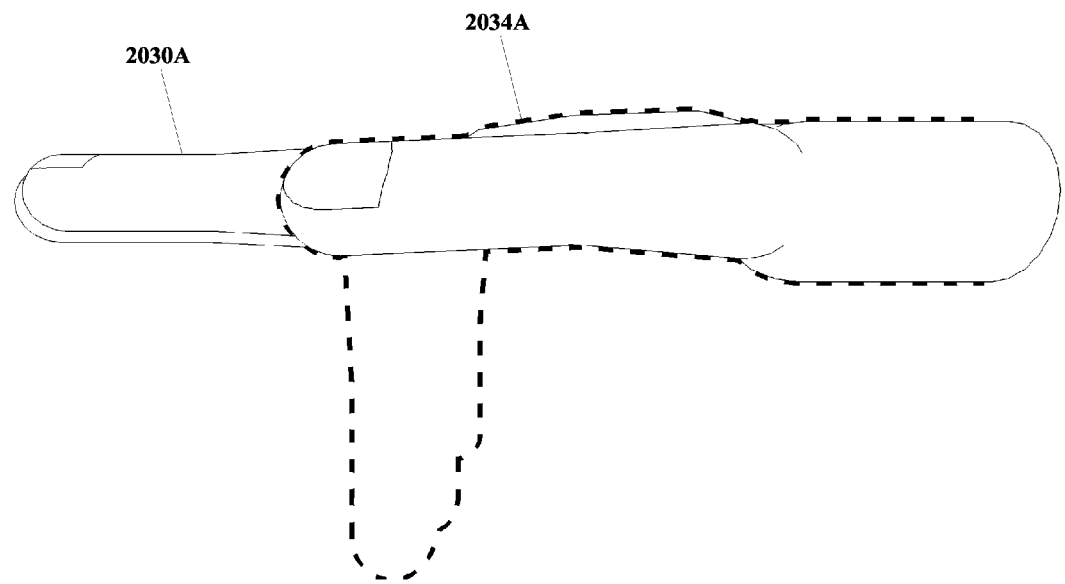

With reference now to FIG. 20A, therein may be seen world data 2030A representing a hand. The configuration of world data 2030A in FIG. 20A may be seen to be at least somewhat similar to the world data 2030 in FIG. 20. FIG. 20A also includes guide data 2034A representing guidance for executing the target position and/or motion for the hand. The guide data 2034A may be seen to be at least somewhat similar to the guide data 2134 in FIG. 21. Thus, FIG. 20A may be considered to represent an intermediate state between FIG. 20 and FIG. 21, wherein the guide data 1032A has been dynamically updated but before the hand and the world data 2030A for the hand has executed the new position and/or motion. In such configuration, some circumstance— e.g. executing the position/motion for FIG. 20—has prompted the target data 2032A to update from the guide data 2034 shown in FIG. 20 to the guide data 2132 shown in FIG. 21.

Although not shown herein, similar intermediate images may be understood to be possible (and/or implied) with regard to other sequences of images in FIG. 5 through FIG. 24.

Thus, as shown, and as previously described, world data, target data, and/or guide data may update dynamically, so as to reflect changes to world data, target data, and/or guide data appropriate to (and/or in response to) changes within the system (e.g. changes of the entity, changes of the subject, etc.)

Collectively, FIG. 5 through FIG. 24 show in detail, individually and/or in combination, examples of world data, target data, and guide data for hand positions and motions, such as may be associated with physical therapy, physical training, medical training, medical treatment, medical diagnostics, etc. However, it is emphasized that the present invention is not limited only to the forms and/or contents of world data, target data, and/or guide data shown in FIG. 5 through FIG. 24, and that other arrangements may be equally suitable. Furthermore, the present invention is not limited only to arrangements wherein body parts alone are considered for purposes of position and/or motion.

At this point it may be useful to expand somewhat on the range of possible forms that world data, target data, and/or guide data may take.

As previously indicated, world data at least substantially represents a state of "the world" (whether that world is real, augmented, virtual, etc.) as may include one or more entities. That is, world data may be considered to represent the world "as it is". In FIG. 5 through FIG. 24, world data is presented therein as being a realistic and/or anthropomorphic image or depiction of the entity in question, namely a hand of a subject. Such an arrangement may be useful, for example because a realistic image may be easily recognizable, because a realistic image might be easily made available to the subject (e.g. by passively revealing the actual hand through a transparent display, actively outputting an image of the hand obtained substantially in real time with a camera, etc.).

However, world data may represent and/or reflect the status of entities without necessarily either showing the entities themselves or realistically simulating those entities. In particular, it is noted that world data is not necessarily required to be displayed to a subject for all embodiments of the present invention. An arrangement—such as may be seen in FIG. 15 through FIG. 19—with no world data displayed may be equally suitable.

Still with reference to a hand as an entity, world data therefor might include a simple outline of the hand, a wireframe for the hand, a simple segment-and-joint illustration or "stick drawing", etc. In addition, world data is not required to be anatomic at all, even when the entity in question is anatomical. For example, world data for a hand might include points, circles, x-marks, etc. representing the position of fingertips, joints, edges, and/or other features.

In addition, world data is not necessarily limited only to reflecting an entity. Consider an example (illustrated and described subsequently herein) wherein a subject is to be instructed in position/motion for a golf club. Even if the golf club is considered the entity under consideration, this would not exclude the possibility that world data may include the hands of the subject manipulating the club, a golf ball, a golf tee, etc. Nor is world data limited to only a single entity at any given time. (Thus, it also is not excluded to consider both the club and the subjects hands to be entities.)

Furthermore, world data is not required to be visible in nature, nor is world data required to be entirely visible even if some portion thereof is visible. For example, world data might include mathematical descriptions of position and/or motion that are not readily expressed visually, and/or that are not visually represented to the subject. World data likewise might include such information as an identity of an entity and/or a subject, for example world data could include information on a specific model of golf club as an entity, the identity of a subject manipulating that golf club, etc.

Typically, though not necessarily, world data may include realistic imagery of one or more entities, and/or some portion of a subject. However, as has been described, this is an example only, and other arrangements may be equally suitable.

With regard to target data, as has been previously indicated target data at least substantially represents a desired state for an arrangement that may include one or more entities. That is, target data may be considered to represent the world "as it should be". In FIG. 5 through FIG. 24, target data is presented therein as being a line-and-joint construct for the entity in question, namely a hand of a subject. Such an arrangement may be useful, for example because such an approach may be simple yet accurate, and/or may be readily displayed.

However, target data may represent target positions and/or motions for entities in different forms. In particular, it is noted that target data is not required to be displayed to a subject. An arrangement—such as may be seen in FIG. 15 through FIG. 19—with no target data displayed may be equally suitable. In addition, even if some target data is and/or could be displayed to a subject, target data may include information that is not visual and/or is not displayed or readily displayable, such as mathematical descriptions of position and/or motion that are not readily expressed visually, and/or that are not visually represented to the subject.

Regardless of whether target data is displayed, the form of target data may vary considerably. Although target data as shown in FIG. 5 through FIG. 24 is line-and-joint data, more realistic constructs and/or portrayals, e.g. life-like representations of a hand, may be equally suitable. (Thus, target data might visually resemble the world data, including but not limited to realistic and/or anthropomorphic depictions, even though for clarity the appearances of example world data and target data are presented as visually distinct in FIG. 5 through FIG. 24.)

As with world data, target data might include a simple outline of the hand, a wireframe for the hand, etc. In addition, target data may be non-anatomical, even when the entity in question is anatomical. For example, target data for a hand might include points, circles, x-marks, etc. representing the position of fingertips, joints, edges, and/or other features. Target data also may include ranges, limits, and/or or other non-unique features, including but not limited to range-of-motion limits such as marks showing an acceptable or preferred range of positions or motions for a hand or finger, a range of suitable angles for bending a finger knuckle or other joint, etc.

Furthermore, target data might include negative information, i.e. information representing something that a subject is not to do, as opposed to what a subject is to do. As more concrete examples, target data might include information indicating that fingers should not be touching in an exercise, that certain joints should not be bent (or should not be straightened), that a hand should not extend past some point or move outside of some range, etc.

In addition, target data is not necessarily limited only to reflecting an entity. Continuing the example wherein a subject is to be instructed in position/motion for a golf club, even if the golf club is considered the entity under consideration, this would not exclude the possibility that target data may include the hands of the subject manipulating the club, a golf ball, a golf tee, etc. Nor is target data limited to only a single entity at any given time. (Thus, it also is not excluded to consider both the club and the subjects hands to be entities.)

Typically, though not necessarily, target data may be non-visible to a subject, including models and/or other data for consideration by a processor. However, as has been described, this is an example only, and other arrangements may be equally suitable.

With regard to guide data, as has been previously indicated guide data at least substantially represents information indicating to a subject how to bring an entity into line with a target position and/or motion. That is, guide data may be considered to represent a bridge for linking world data for an entity "as it is" and target data for an entity "as it should be", so as to guide the subject in bringing the world into the configuration that the world is desired to have.

In FIG. 5 through FIG. 24, guide data is presented therein as being a dashed outline for the entity in question, namely a hand of a subject. Such an arrangement may be useful, for example because such an approach may be simple to implement yet clearly understandable by the subject, and/or may be readily displayed.

However, guide data may represent target positions and/or motions for entities in different forms. Although target data as shown in FIG. 5 through FIG. 24 is substantially two-dimensional outline, more realistic constructs and/or portrayals, e.g. life-like representations of a hand, may be equally suitable. (Thus, guide data might visually resemble world data and/or target data, including but not limited to realistic and/or anthropomorphic depictions, even though for clarity the appearances of example world data, target data, and guide data are presented as visually distinct in FIG. 5 through FIG. 24.)

As with world data and target data, guide data may include a line-and-joint model of the hand, a wireframe for the hand, a filled/colored area for the hand, etc. In addition, guide data may be non-anatomical, even when the entity in question is anatomical. For example, guide data for a hand might include points, circles, x-marks, etc. representing the position of fingertips, joints, edges, and/or other features. Guide data also may include ranges, limits, and/or or other non-unique features, including but not limited to range-of-motion limits such as marks showing an acceptable or preferred range of positions or motions for a hand or finger, a range of suitable angles for bending a finger knuckle or other joint, etc.

Furthermore, guide data may include negative information, i.e. information representing something that a subject is not to do, as opposed to what a subject is to do. As more concrete examples, guide data might include information indicating that fingers should not be touching in an exercise, that certain joints should not be bent (or should not be straightened), that a hand should not extend past some point or move outside of some range, etc.

In addition, guide data is not necessarily limited only to reflecting an entity. Continuing the example wherein a subject is to be instructed in position/motion for a golf club, even if the golf club is considered the entity under consideration, this would not exclude the possibility that guide data may include the hands of the subject manipulating the club, a golf ball, a golf tee, etc. Nor is guide data limited to only a single entity at any given time. (Thus, it also is not excluded to consider both the club and the subjects hands to be entities.)

Figure 25:
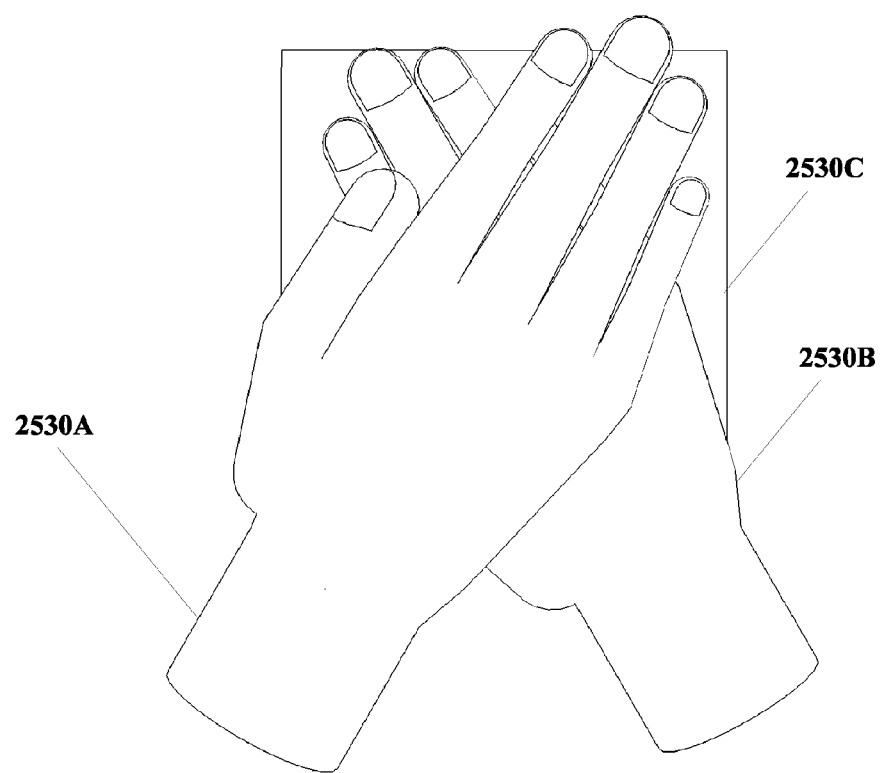
FIG. 25 illustrates world data and/or target data for an example position and/or motion as might be instructed according to the present invention, as might relate to medical treatment.

Moving on now to FIG. 25, as has been described position and motion instruction according to the present invention may include entities aside from a subject or a portion of a subject, may include a subject only, and/or may include a combination thereof.

FIG. 25 shows an arrangement of world data collectively 2530, representing a top-down view of a first hand 2530A of a subject, a second hand 2530B of a subject, and a bandage 2530C under compression by the first and second hands 2530A and 2530B. It is pointed out that the world data 2530 as shown includes both an entity—a bandage 2530C—and two portions of a subject 2530A and 2530B. (For purposes of this description the bandage 2530C is referred to as the entity, but for certain embodiments, either or both of the hands 2530A and 2530B may be considered to be entities in addition to or in place of the bandage 2530C.)

It will be understood that bandage compression as shown may represent position and/or motion instruction associated with medical training, medical treatment, first aid/cpr, etc.

Figure 26:
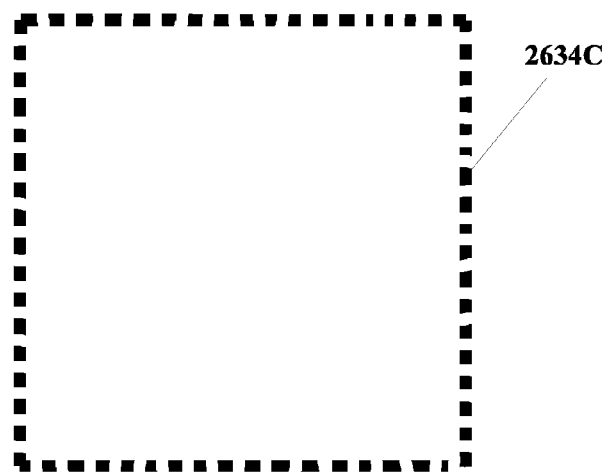
FIG. 26 through FIG. 28 illustrate guide data for an example position and motion corresponding with FIG. 25.

Now with reference to FIG. 26, guide data 2634C is shown therein. As illustrated, guide data 2634C is a dashed outline; comparison with FIG. 25 will reveal that guide data 2634C in FIG. 26 at least substantially outlines bandage 2530C in FIG. 25. Again with reference to FIG. 26, guide data 2634C therein represents and/or refers to the entity, a bandage, without representing the subject (or hands thereof). The arrangement in FIG. 26 thus may guide a subject in positioning and/or moving a bandage for application thereof. Such an arrangement may be useful, for instance when the only and/or primary focus of a position and/or motion relates to the bandage or other entity (as opposed to the subject and/or hands thereof).

Figure 27:
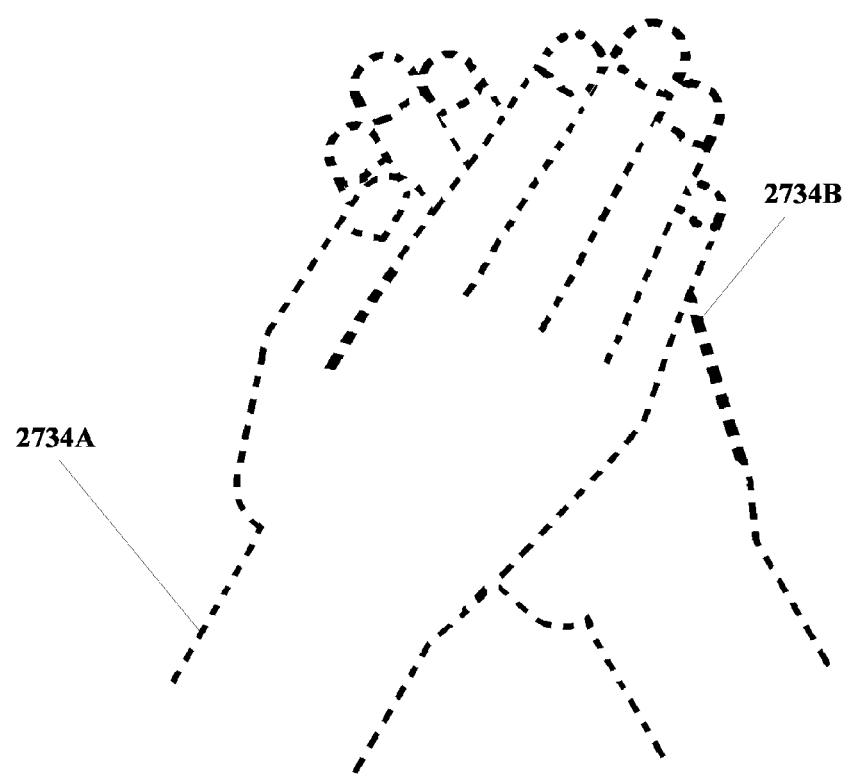

Referring now to FIG. 27, guide data 2734A and 2734B is shown therein. As illustrated, the guide data 2734A and 2734B are dashed outlines; comparison with FIG. 25 will reveal that the guide data 2734A and 2734B in FIG. 27 at least substantially outline the hands 2530A and 2530B in FIG. 25. Again with reference to FIG. 27, the guide data 2734A and 2734B therein represents and/or refers to only the subject in the form of the hands thereof, without representing the bandage. The arrangement in FIG. 27 thus may guide a subject in positioning and/or moving hands so as to apply a bandage. Such an arrangement may be useful, for instance in circumstances where the only and/or primary focus of a position and/or motion might be considered to relate to the subject and/or hands thereof (as opposed to the entity).

Figure 28:
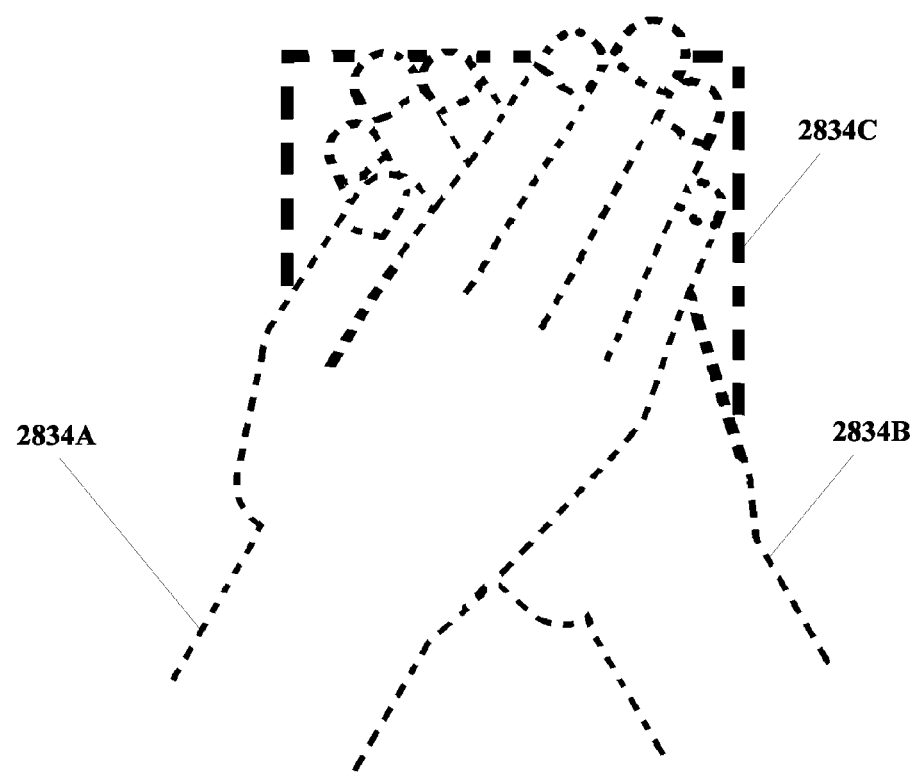

In FIG. 28 guide data 2834A, 2834B, and 2834C is shown. As illustrated, guide data 2834A, 2834B, and 2834C are dashed outlines; comparison with FIG. 25 will reveal that guide data 2834A and 2834B in FIG. 28 at least substantially outlines hands 2530A and 2530B in FIG. 25, while guide data 2834C in FIG. 28 at least substantially outlines bandage 2530C in FIG. 25. Again referring to FIG. 28, guide data 2834A and 2834B represents and/or refers to the subject in the form of hands, while guide data 2834C represents and/or refers to the entity in the form of the bandage. The arrangement in FIG. 28 thus may guide a subject in positioning and/or moving hands and a bandage to apply the bandage. Such an arrangement may be useful, e.g. in circumstances where both entity and subject may be of equal or at least substantial importance.

Figure 29:
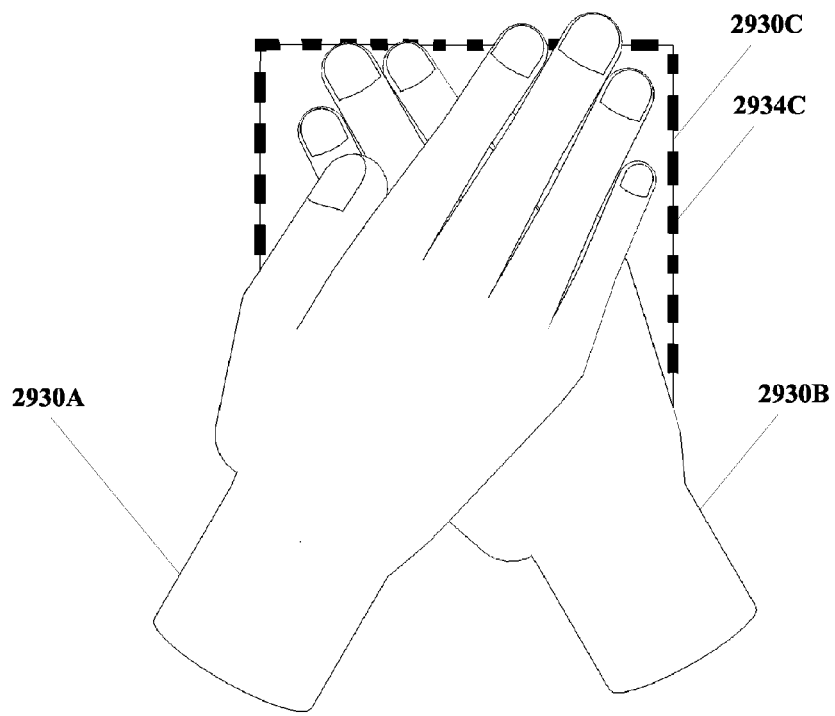
FIG. 29 through FIG. 31 illustrate combined world data and guide data for an example position and/or motion corresponding with FIG. 25.
Figure 30:
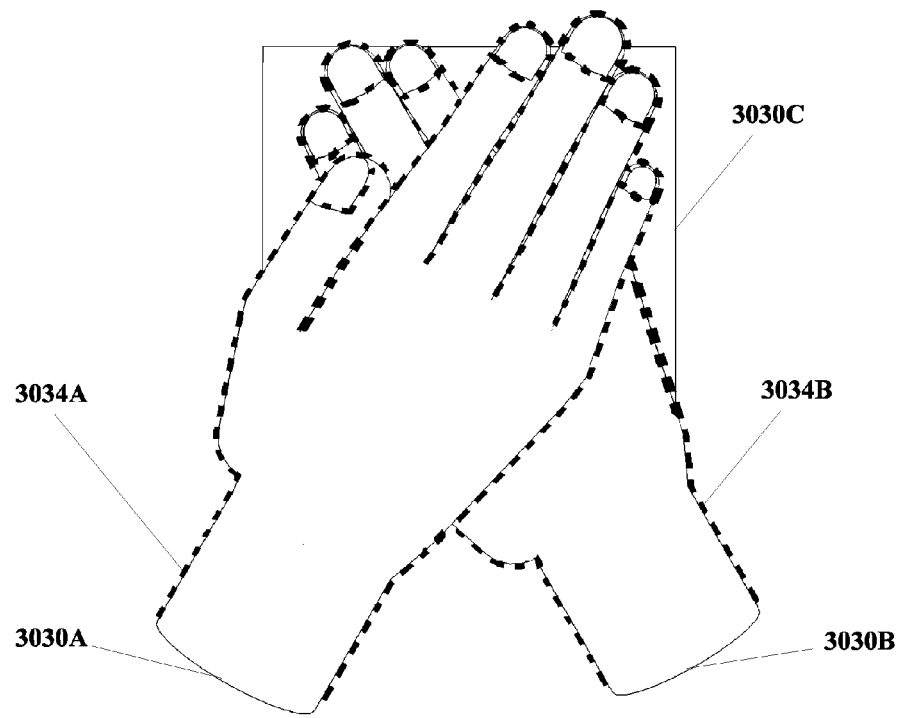
Figure 31:
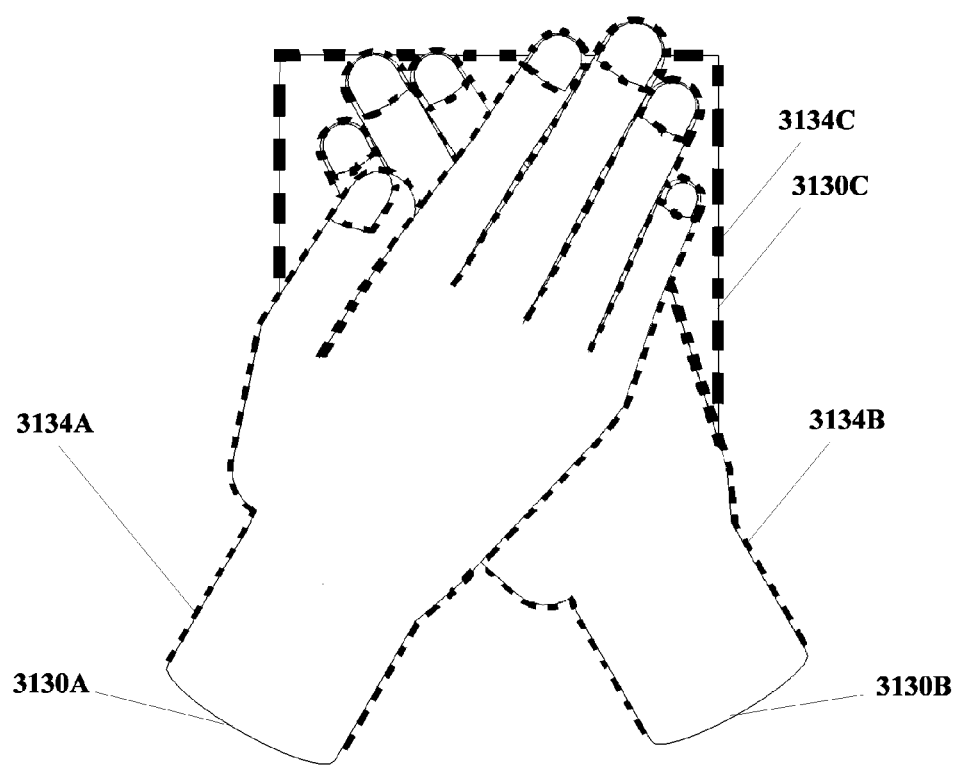

Now with reference to FIG. 29 through FIG. 31, guide data comparable to that in FIG. 26, FIG. 27, and FIG. 28 is shown in conjunction with world data comparable to that in FIG. 25, e.g. as might be output to a subject.

With reference particularly to FIG. 29, therein world data representing a first hand 2930A, a second hand 2930B, and a bandage 2930C is shown. In addition, guide data is shown representing a bandage 2934C. The arrangement in FIG. 29 thus may guide a subject in positioning and/or moving a bandage so as to apply the bandage.

With reference to FIG. 30, therein world data representing a first hand 3030A, a second hand 3030B, and a bandage 3030C is shown. In addition, guide data is shown representing a first hand 3034A and a second hand 3034B. The arrangement in FIG. 30 thus may guide a subject in positioning and/or moving hands so as to apply a bandage.

In FIG. 31 world data representing a first hand 3130A, a second hand 3130B, and a bandage 3130C is shown. In addition, guide data is shown representing a first hand 3134A, a second hand 3134B, and a bandage 3134C. The arrangement in FIG. 31 thus may guide a subject in positioning and/or moving hands and a bandage so as to apply the bandage.

Considering FIG. 26 through FIG. 31 compared to FIG. 25 it will be understood that guide data according to the present invention may represent and/or refer to the entity only, the subject only, and/or both the entity and the subject as shown in FIG. 26, FIG. 27, and FIG. 28, respectively. For certain embodiments, guide data may be output to the subject showing the entity only, the subject only, and/or both entity and subject as in FIG. 26, FIG. 27, and FIG. 28, respectively. For other embodiments guide data may be output to a subject in combination with world data, showing guide data for the entity only, guide data for the subject only, and/or guide data for both entity and subject as in FIG. 29, FIG. 30, and FIG. 31 respectively.

Similarly, although examples are not shown in FIG. 26 through FIG. 31, some, all, or none of the world data may be established and/or output to the subject. As a more particular example, the world data for the bandage only, the hands only, or the bandage and hands together may be established, and likewise (if established) world data for the bandage only, the hands only, or the bandage and hands together may be output to the subject.

Similarly, although examples are not shown in FIG. 26 through FIG. 31 (and as noted target data may be non-visible to the subject), target data may be established and/or outputted referencing the entity only, the subject only, and/or both the entity and the subject.

As has been stated, not all world data, target data, and/or guide data regarding an entity or a subject must be either established or output to a subject. Now with reference to FIG. 32, an arrangement illustrating only partial establishing and/or out put of data is shown beginning therein.

Figure 32:
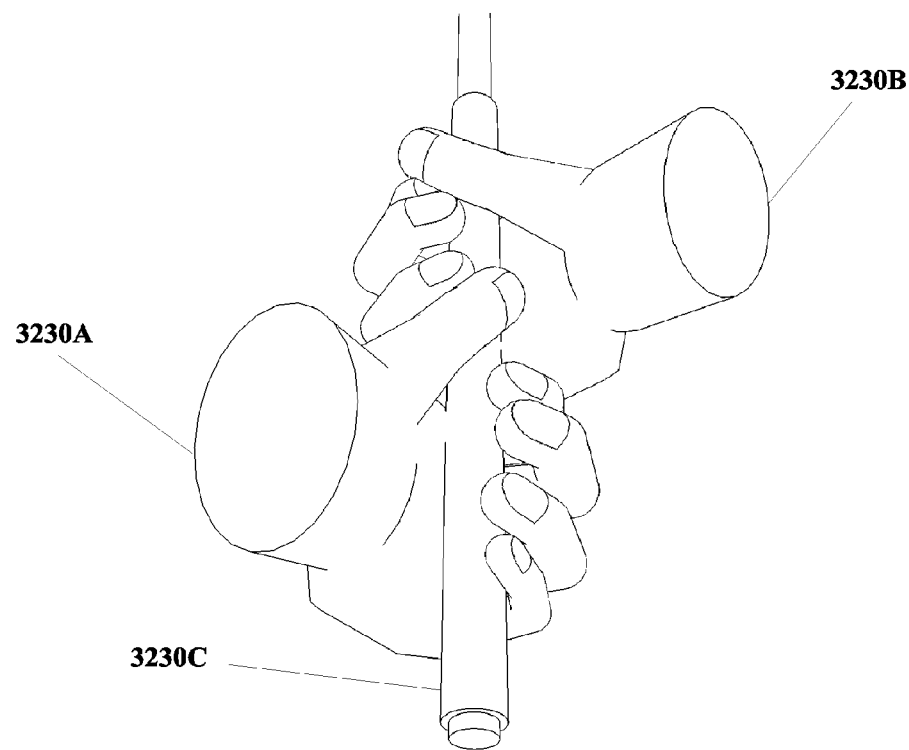
FIG. 32 illustrates world data and/or plan data for an example position and/or motion as might be instructed according to the present invention, as might relate to recreation.

In FIG. 32, an arrangement is shown of world data collectively 3230, representing a perspective view of a first hand 3230A of a subject, a second hand 3230B of a subject, and a golf club 3230C held by the first and second hands 3230A and 3230B. It is pointed out that only a portion of the golf club 3230C is shown, i.e. the grip and a portion of the shaft thereof; the full shaft, head, etc. of the golf club 3230C are not shown, and depending on the particulars of an embodiment may be considered not to have been either established or output to the subject. (Similarly, and as in previous figures, the full subject is not shown aside from the hands 3230A and 3230B thereof, and depending on the particulars of an embodiment may be considered not to have been either established or output to the subject.)

Figure 33:
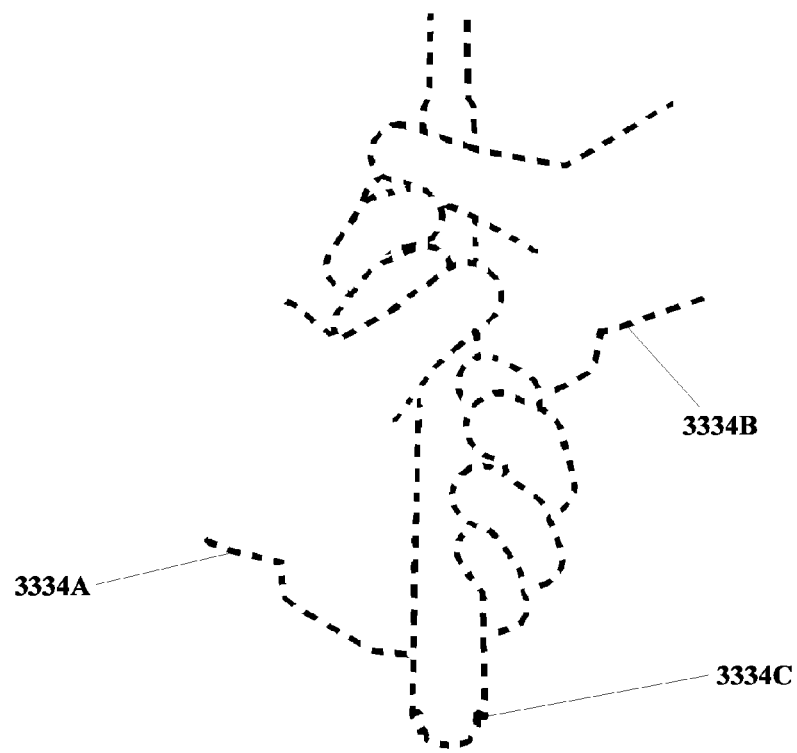
FIG. 33 illustrates guide data for an example position and motion corresponding with FIG. 32.

Turning to FIG. 33, guide data 3334 is shown therein, including guide data 3334A, 3334B, and 3334C. As illustrated, the guide data 3334 is a dashed outline; comparison with FIG. 32 will reveal that the guide data 3334A in FIG. 33 at least substantially outlines the first hand 3230A in FIG. 32, that the guide data 3334B in FIG. 33 at least substantially outlines the second hand 3230B in FIG. 32, and that the guide data 3334C in FIG. 33 at least substantially outlines the golf club 3230C in FIG. 32. The arrangement in FIG. 33 thus may guide a subject in positioning and/or moving hands and/or a golf club.

Figure 34:
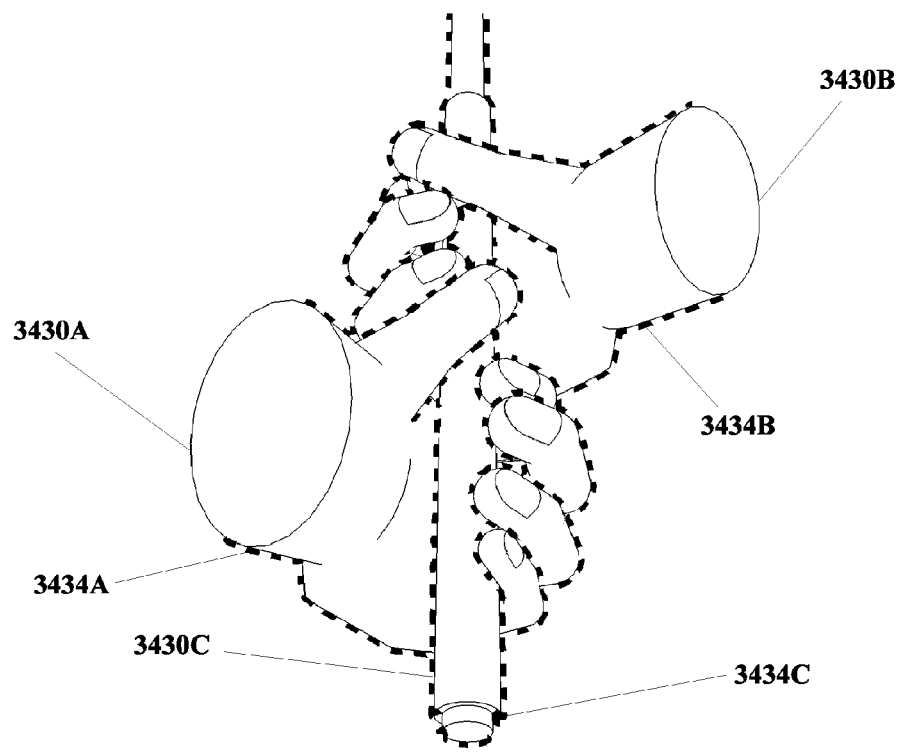
FIG. 34 illustrates combined world data and guide data for an example position and/or motion corresponding with FIG. 32.

Moving on to FIG. 34, world data 3430 is visible, representing a perspective view of a first hand 3430A of a subject, a second hand 3430B of a subject, and a golf club 3430C held by the first and second hands 3430A and 3430B. Again, only a portion of the golf club 3430C is shown, i.e. the grip and a portion of the shaft thereof. Also in FIG. 34, guide data 3434 is visible, representing an outline of a perspective view of a first hand 3434A of a subject, a second hand 3434B of a subject, and a golf club 3434C held by the first and second hands 3430A and 3430B. As may be seen, guide data 3434C for only a portion of the golf club 3430C is shown, and depending on the particulars of an embodiment may be considered not to have been either established or output to the subject. (Similarly, and as in previous figures, guide data for the full subject is not shown aside from guide data for the hands 3434A and 3434B thereof, and depending on the particulars of an embodiment may be considered not to have been either established or output to the subject.)

Similarly, although not shown, target data likewise is not required to encompass an entirety of an entity, and/or an entirety of a subject.

It will be understood that gripping a golf club as illustrated in FIG. 32 through FIG. 34 may represent sports activity, recreational activity, physical training, etc.

Figure 35:
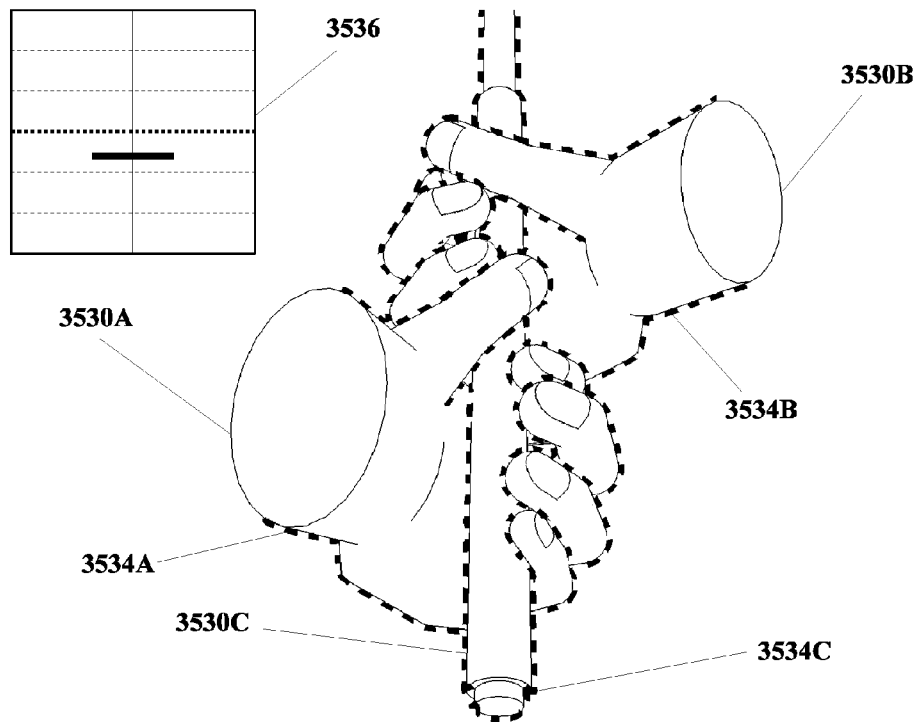
FIG. 35 and FIG. 36 illustrate combined world data, guide data, and evaluation data for an example position and/or motion corresponding with FIG. 32.

As noted previously the present invention may include evaluation data. For example, in FIG. 35 is shown an arrangement at least somewhat similar to that in FIG. 34. In the arrangement of FIG. 35 world data 3530 is visible, representing a perspective view of a first hand 3530A of a subject, a second hand 3530B of a subject, and a golf club 3530C held by the first and second hands 3530A and 3530B. Also in FIG. 35 guide data 3534 is visible, representing an outline of a perspective view of a first hand 3534A of a subject, a second hand 3534B of a subject, and a golf club 3534C held by the first and second hands 3530A and 3530B.

In addition, FIG. 35 shows therein evaluation data 3536. Evaluation may for example be adapted to compare the state of world data against target data (whether instantaneously, over time, etc.).

The evaluation data 3536 as shown in FIG. 35 takes the form of a gauge display, of a sort that might indicate the balance position of the golf club 3530C, the angle of the club 3530C relative to the ground, etc. Such an arrangement may be useful, for example in providing a subject with information that may not be immediately apparent from other sources. To continue the above examples, the balance of the club 3530C may not be visually apparent, nor will the angle of the club 3530C with respect to the ground necessarily be clear to the subject (for example depending on the subject's point of view). Alternately, evaluation data might be used to emphasize some feature that is visible, but that may merit emphasis, such as the position of the subject's hands 3530A and 3530B on the grip of the club 3530C. Many types of evaluation data may be shown using such a display of evaluation data 3536, and many other types of evaluation data 3536 may be possible within the scope of the present invention.

Figure 36:
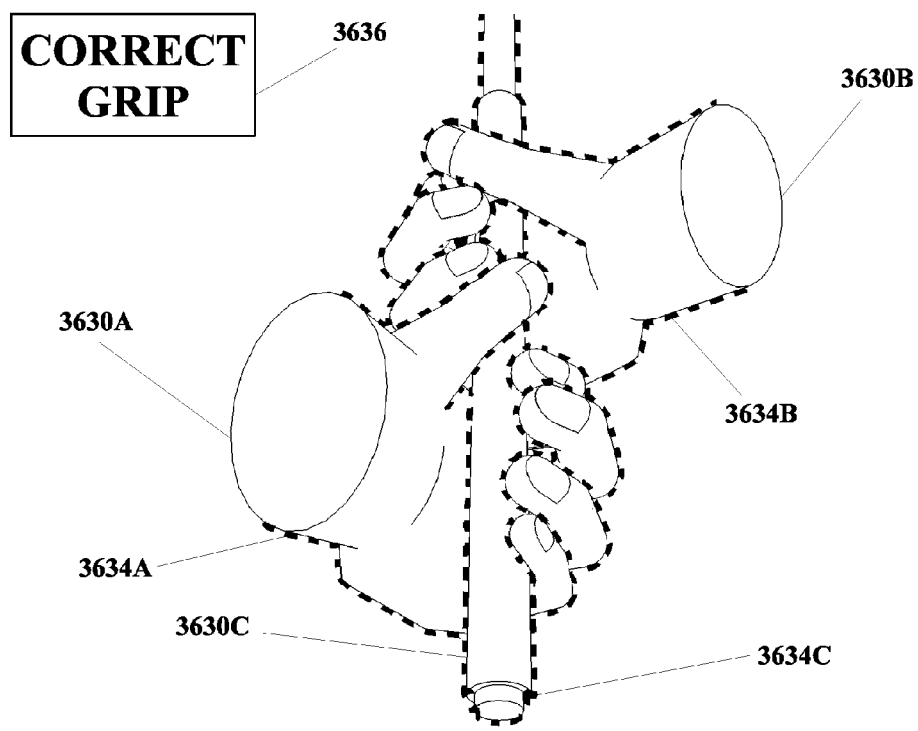

For example, turning to FIG. 36, another arrangement at least somewhat similar to that in FIG. 34 is shown. In FIG. 36 world data 3630 is visible, representing a perspective view of a first hand 3630A of a subject, a second hand 3630B of a subject, and a golf club 3630C held by the first and second hands 3630A and 3630B. Also in FIG. 36 guide data 3634 is visible, representing an outline of a perspective view of a first hand 3634A of a subject, a second hand 3634B of a subject, and a golf club 3634C held by the first and second hands 3630A and 3630B.

FIG. 36 also includes evaluation data 3636. The evaluation data 3636 as shown takes the form of a text display, indicating thereon that the grip on the club 3630C is correct.

These are examples only, and evaluation data may take other forms, including but not limited to text, visual images, animations, icons, gauges, models, data analyses, etc.

In addition, evaluation data may be dynamically updated similarly to world data, target data, and/or guide data. For example, with reference again to FIG. 35 the gauge 3536 might update substantially in real time, so that a subject might adjust the balance of the club 3530C (or some other property) until he or she is satisfied therewith, etc. Similarly, with reference to FIG. 36 the text box 3636 might show different text under different conditions, e.g. "grip incorrect", "adjust grip", "shift grip up", "loosen left hand", "curl right thumb", etc.

Figure 37:
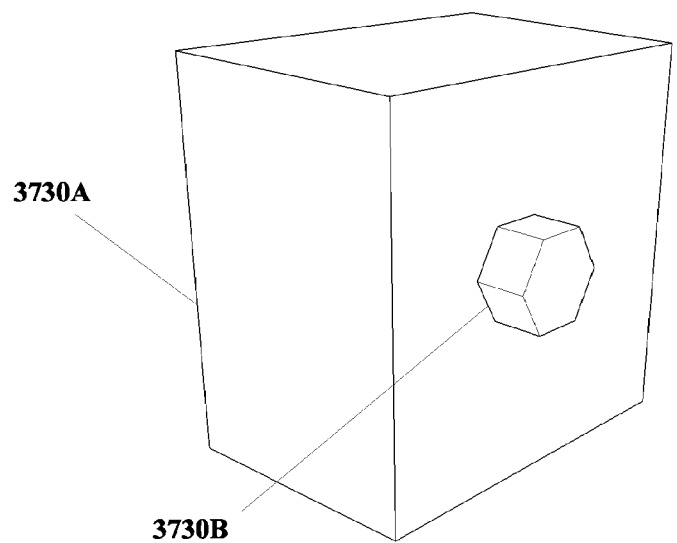
FIG. 37 through FIG. 39 illustrate world data and/or plan data for an example position and/or motion as might be instructed according to the present invention, as might relate to a mechanical system.

Now with reference to FIG. 37, therein is shown an arrangement of world data 3730 collectively representing a mechanical system. More particularly, the world data 3730 includes a body 3730A with a hex bolt 3730B rotatably disposed therein. It is emphasized that the present invention is not limited to the particular mechanical system shown (any more than to carpal tunnel exercises, golf swings, etc. as previously shown), and that the mechanical system shown is an example only.

Figure 38:
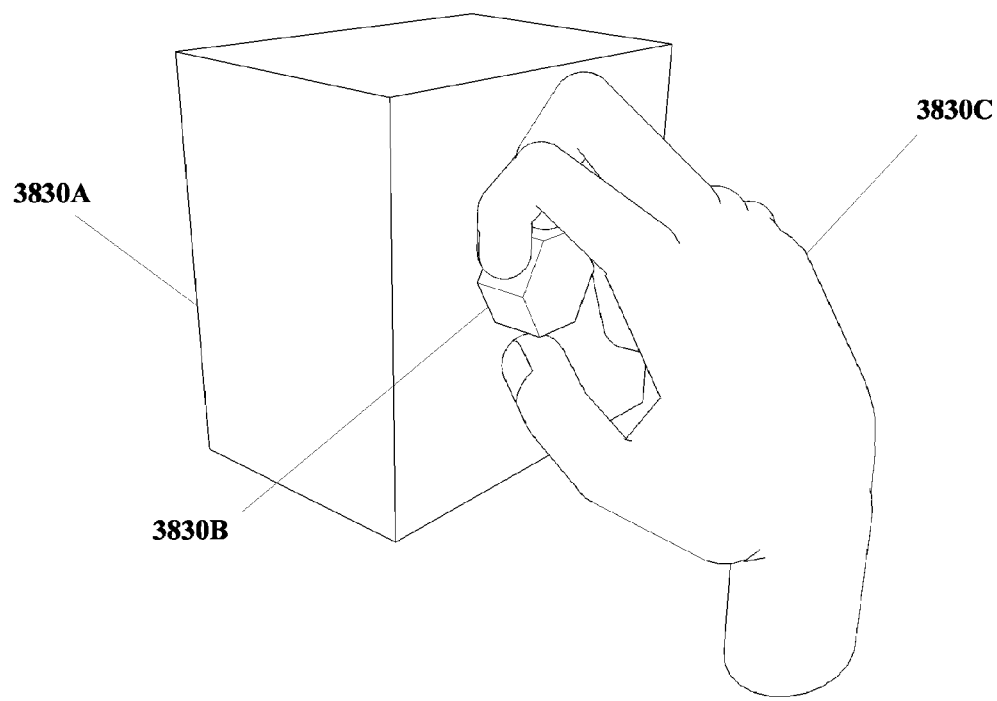

Moving on to FIG. 38, therein is shown world data 3830 at least somewhat similar to that in FIG. 37, having a body 3830A with a hex bolt 3830B rotatably disposed therein. FIG. 38 also shows a subject's hand 3830C in a position as to grip the bolt 3830B.

Figure 39:
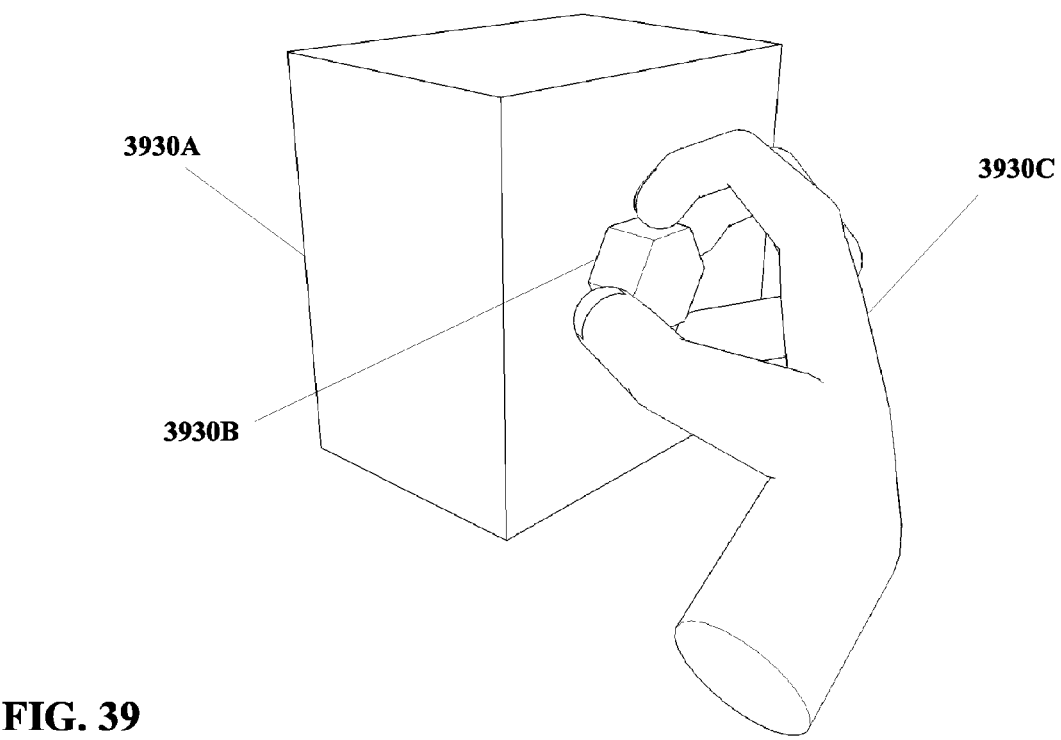

Turning to FIG. 39, therein is shown world data 3930 at least somewhat similar to that in FIG. 38, having a body 3930A with a hex bolt 3930B rotatably disposed therein. FIG. 39 also shows a subject's hand 3930C in a position as to grip the bolt 3930B. However, as shown in FIG. 39 the hand 3930C has twisted approximately 60 degrees clockwise, rotating the bolt 3930B therewith.

Collectively, FIG. 37 through FIG. 39 may be considered to be a time sequence and/or an action sequence of world data, wherein a hand is applied to engage a bolt on a body, and the hand then rotates the bolt.

As has been described, guide data in particular may take many forms. World data at least substantially represents an entity and/or subject as they are, and target data at least substantially represents the entity and/or subject as they should be, and both may vary considerably. However, guide data does not necessarily have to represent either what is or what should be, but rather is adapted to provide guidance in transitioning between what is and what should be. Such guidance may vary greatly, depending for example on individual entities, individual subjects, cultural norms, instruction conventions, etc.

In particular, it is noted that guide data according to the present invention is not required to be either complete or explicit. That is, at least certain information may be suggested, implied, or even omitted, so long as the intent insofar as position or motion may be understood.

Figure 40:
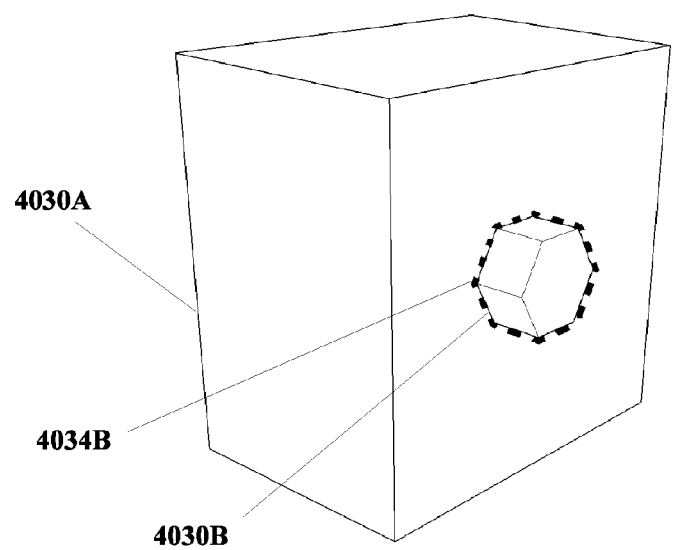
FIG. 40 through FIG. 46 illustrate combined world data and guide data for an example position and/or motion corresponding with FIG. 37 through FIG. 39.

For example in FIG. 40 an arrangement at least somewhat similar to FIG. 37 is shown, with world data showing a body 4030A with a hex bolt 4030B rotatably disposed therein.

FIG. 40 also includes guide data 4030B in the form of an outline of the hex bolt 4030B.

Figure 41:
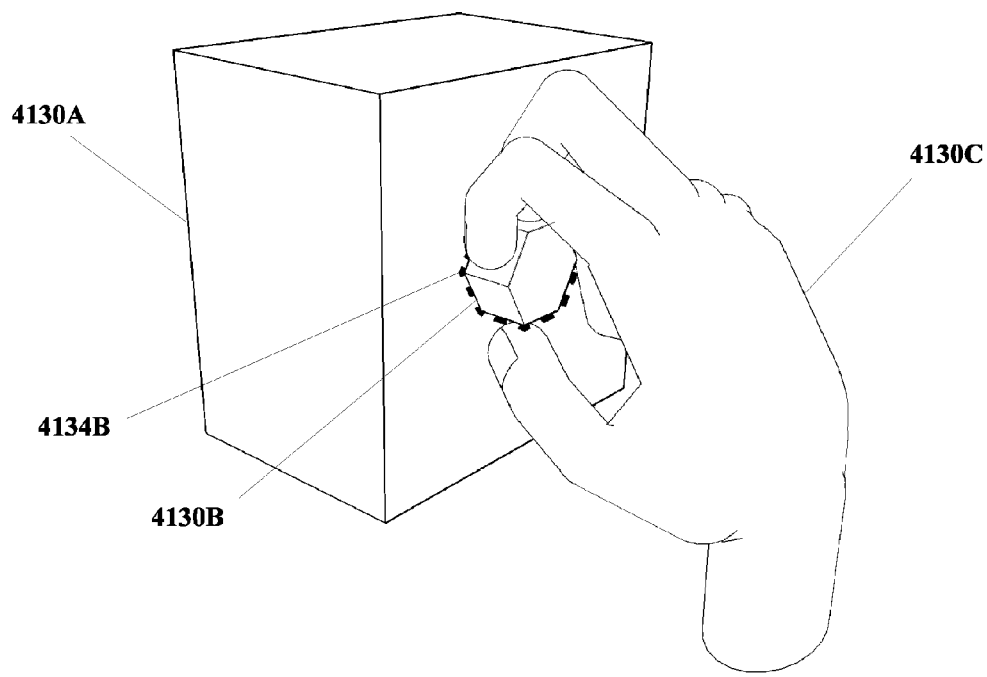

FIG. 41 shows world data including a body 4130A with a hex bolt 4130B rotatably disposed therein, and a hand 4130C, along with guide data 4130B in the form of an outline of the hex bolt 4130B.

Figure 42:
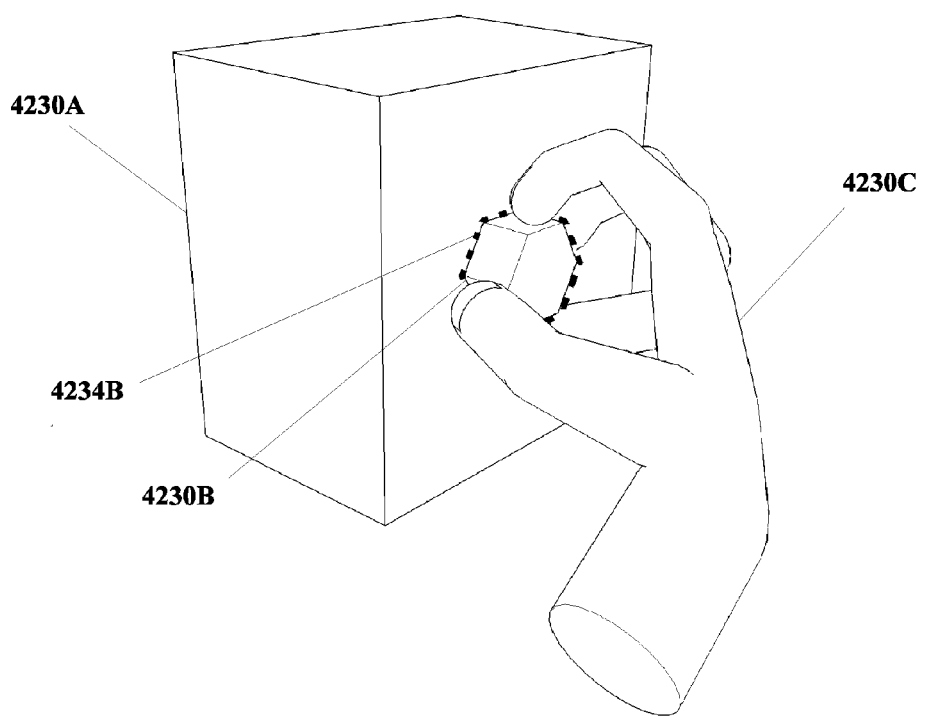

FIG. 42 also shows world data including a body 4230A with a hex bolt 4230B rotatably disposed therein, and a hand 4230C, along with guide data 4230B in the form of an outline of the hex bolt 4230B. Compared against FIG. 41, the hand 4230C and the bolt 4230B have been rotated approximately 60 degrees counterclockwise.

Collectively, FIG. 40 through FIG. 42 may be considered to represent an example of guide data (potentially though not necessarily dynamically updated) instructing a user in executing a position and/or motion of a hex bolt on a body. It is noted that as shown, the intended position and/or motion of the hex bolt is not made explicit. Rather, guide data indicates the hex bolt as an entity upon which to execute some position and/or motion, with the specifics being implied. Such an approach may be suitable for at least certain embodiments, hex bolts being one such example. That is, typically a hex bolt may be expected to function by turning, either fastening or being loosened thereby, and moreover hex bolts typically tighten through clockwise turning and loosen through counterclockwise turning. Thus, for certain embodiments the details of position and/or motion may be implicit, with relatively minimal guide data being provided in the form of an indication of the hex bolt rather than a specific instruction therefor.

In addition, it will be understood that manipulating a hex bolt as illustrated in FIG. 40 through FIG. 42 may represent recreational activity, fabrication, repair, operation of devices and/or systems (whether mechanical, electrical, computational, or otherwise), etc.

Figure 43:
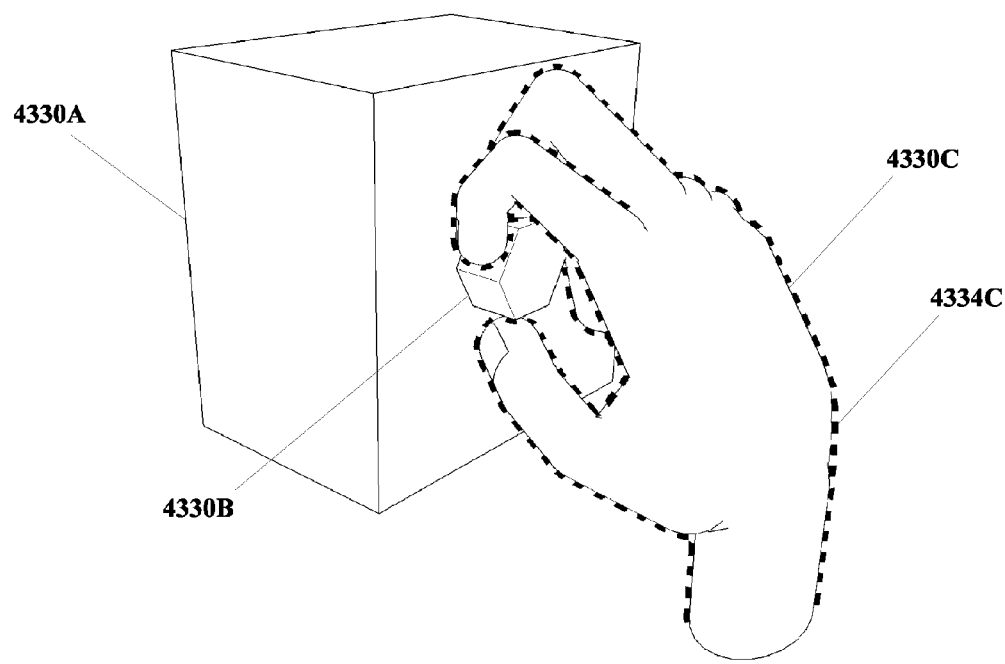

Now with reference to FIG. 43, an arrangement at least somewhat similar to FIG. 38 is shown therein, with world data including a body 4330A with a hex bolt 4330B rotatably disposed therein, and a hand 4330C engaging the hex bolt 4330B. FIG. 43 also includes guide data 4034C in the form of an outline of the hand 4030C.

Figure 44:
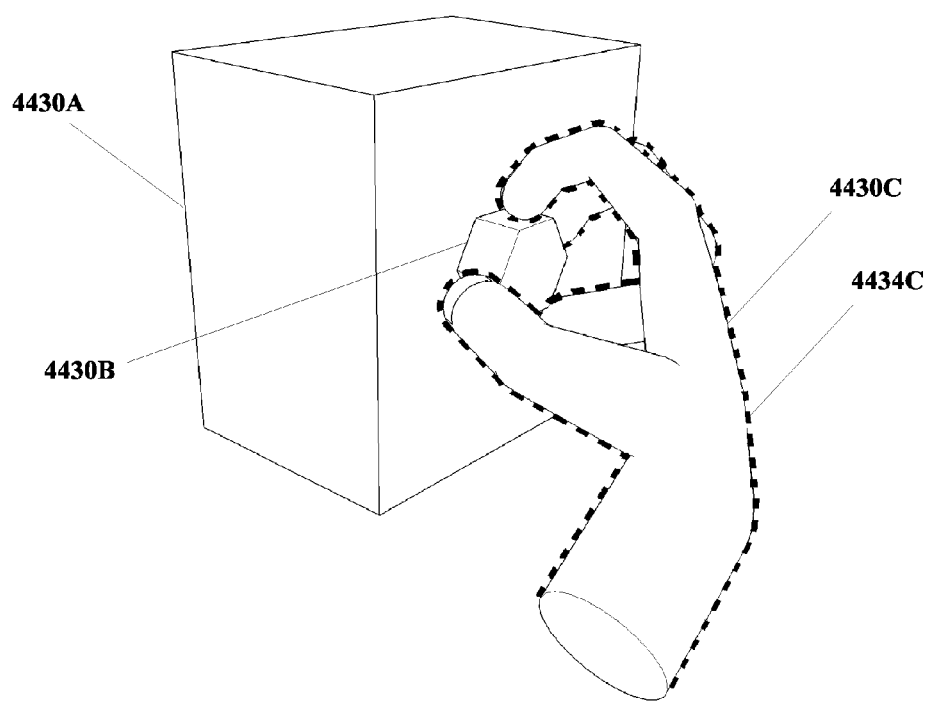

FIG. 44 also shows world data including a body 4430A with a hex bolt 4430B rotatably disposed therein, and a hand 4430C, along with guide data 4430B in the form of an outline of the hand 4430C. Compared against FIG. 43, the hand 4430C and the bolt 4430B have been rotated approximately 60 degrees counterclockwise.

Collectively FIG. 40, FIG. 43, and FIG. 44 may be considered to represent an example of dynamically updated guide data instructing a subject in executing a position and/or motion of a hex bolt. As described for FIG. 40 through FIG. 42, the intended position and/or motion of the hex bolt is not made explicit. Rather, guide data indicates that the subject's hand is to be disposed in a configuration near/touching the bolt, and is to rotate. Again, at least certain specifics are implied, with the motion of the bolt not being shown explicitly in this example.

Figure 45:
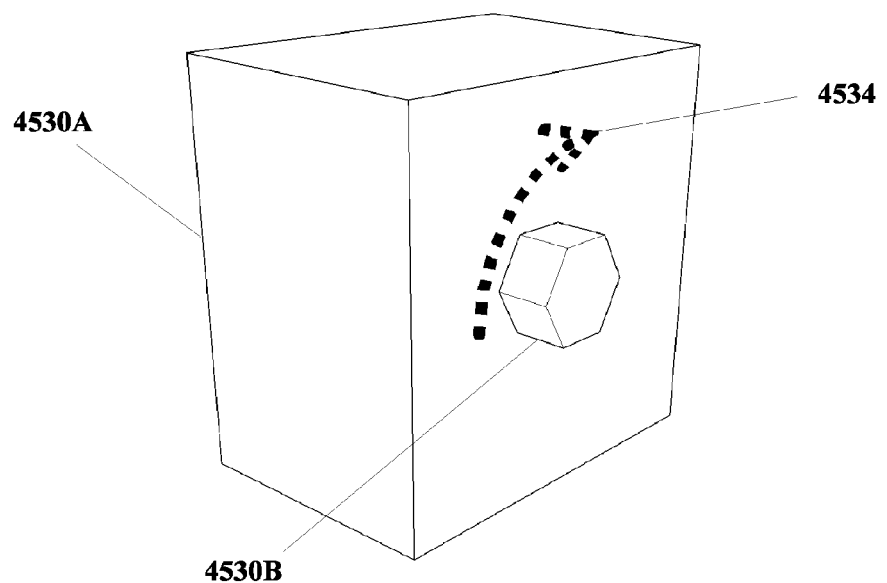

Turning now FIG. 45, therein is shown an arrangement with world data including a body 4530A with a hex bolt 4530B rotatably disposed therein. FIG. 45 also includes guide data 4534 in the form of an arrow proximate the bolt 4530B and extending in a partial circumference thereabout, with the head of the arrow 4534 indicating a clockwise direction. This arrangement may be considered to represent guide data (potentially but not necessarily dynamically updated) instructing a subject in executing a position and/or motion of a hex bolt 4530B on a body 4530A. The intended position and/or motion of the hex bolt 4530B is not made explicit, nor is it made explicit that the bolt 4530B is to be positioned/moved. However, the guide data indicates a clockwise motion in the vicinity of the bolt 4530B, which may be understood to imply positioning and/or motion of the bolt 4530B. Again, at least certain specifics are implied, with the motion of the bolt 4530B not being shown explicitly in this example, nor even the hands of a subject, a tool held by the subject, etc.

Figure 46:
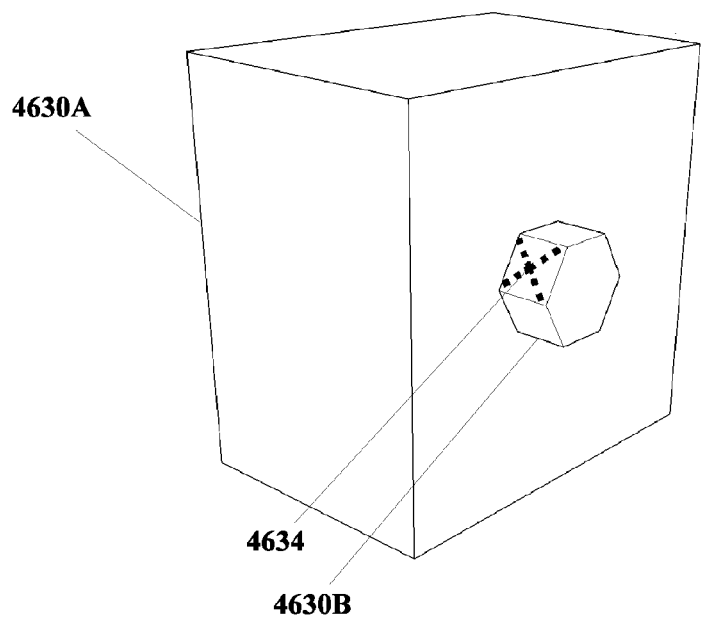

FIG. 46 shows an arrangement with world data including a body 4630A with a hex bolt 4630B rotatably disposed therein. FIG. 46 also includes guide data 4634 in the form of an x marking a point of contact on the bolt 4630B. This arrangement may be considered to represent guide data (potentially but not necessarily dynamically updated) instructing a subject in executing a position and/or motion of a hex bolt 4630B on a body 4630A. The intended position and/or motion of the hex bolt 4630B is not made explicit, nor is it made explicit that the bolt 4630B is to be positioned/moved. However, guide data indicates a clockwise motion in the vicinity of the bolt 4630B, which may be understood to imply positioning and/or motion of the bolt 4630B. Thus at least certain specifics are implied, with the motion of the bolt 4630B not being shown explicitly, nor even the hands of a subject, or a tool held by the subject, etc.

However, although as shown in several preceding examples the present invention does not necessarily require complete, explicit and/or comprehensive guide data, such complete, explicit and/or comprehensive guide data also is not excluded from the present invention.

Figure 47:
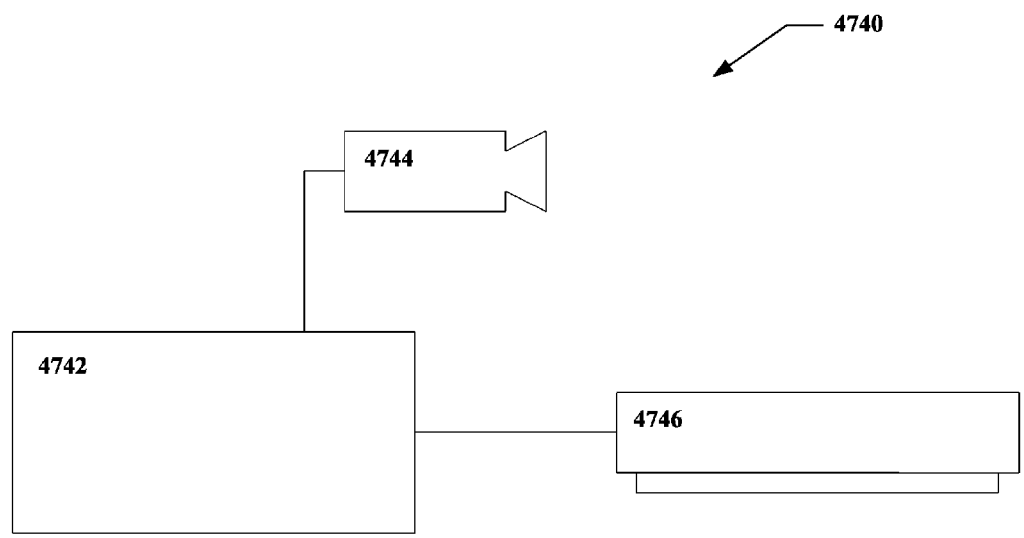
FIG. 47 and FIG. 48 illustrate example embodiments of an apparatus according to the present invention, in schematic form.

Turning now to FIG. 47, therein is shown a schematic for an example apparatus 4740 for position and motion instruction according to the present invention. The apparatus 4740 includes a processor 4742, a sensor 4744 in communication with the processor, and a display 4746 in communication with the processor.

One or both of the processor 4742 and the sensor 4744 are adapted to establish world data, the world data including a world position of one or more entities and/or a world motion of one or more entities. It is noted that, for an arrangement wherein the processor 4742 is adapted to establish world data absent a sensor, the sensor 4744 may not be required. However, typically although not necessarily, the sensor 4744 either establishes the world data or cooperates with the processor 4742 in establishing the world data.

The world data may include world positions and/or world motions for non-entities, including but not limited to a person or other subject (although as noted elsewhere herein in some arrangements the subject may be the entity in question), environments, phenomena and conditions, etc. The world data also may include information other than position and/or motion, including but not limited to other properties of the entity, properties of the subject, properties of the environment, etc.

Where the processor 4742 is adapted to establish world data, the processor 4742 may be adapted to dynamically update world data, for example until some condition is met.

The processor 4742 is also adapted to establish target data, the target data including a target position of one or more entities and/or a target motion of one or more entities. As with world data, target data may include target positions and/or motions for non-entities, and/or may include information other than position and/or motion.

The processor 4742 may be adapted to dynamically update target data, for example until some condition is met.

The processor 4742 is further adapted to establish guide data, the guide data being adapted to provide guidance (e.g.

to a subject) for the entity toward the target position and/or target motion. Guide data may include guidance other than that for guiding the entity toward the target position and/or target motion, and/or information other than such guidance.

The processor 4742 may be adapted to dynamically update guide data, for example until some condition is met.

The processor 4742 may be adapted to establish evaluation data, the evaluation data being at least substantially representative of an evaluation and/or comparison of world data against target data. Evaluation data may include information evaluating and/or comparing data other than world data against target data, and/or may include information other than evaluation and/or comparison data.

These are examples only, and other arrangements for world data, target data, guide data, and evaluation data may be equally suitable.

The processor 4742 may be adapted to record any or all of the world data, target data, guide data, and/or evaluation data. Other information generated or obtained associated with the use of the apparatus (or execution of a method according to the present invention) likewise may be stored.

A range of general-purpose, special-purpose, and embedded systems may be suitable for use as the processor 4742. It may also be suitable for the processor 4742 to consist of two or more physical or logical processor components.

As noted, the sensor 4744 may not be required (and thus may not be present) for some embodiments wherein the processor 4742 is adapted to establish world data absent a sensor. Where present, the sensor 4744 may be adapted to establish world data as described above.

For embodiments including a sensor 4744, a variety of sensors may be suitable. As illustrated in FIG. 47 the sensor 4744 therein is shown as an imager, such as a CCD or CMOS digital camera. However, other arrangements, including but not limited to optical depth sensors (e.g. using structured light, time of flight, etc.), ultrasonic sensors, etc. may be equally suitable. Likewise, sensors such as gyroscopes, accelerometers, contact sensors, pressure sensors, etc. also may be equally suitable. Furthermore, as noted elsewhere herein world data is not limited only to position and/or motion, and sensors adapted to sensing features unrelated to position and/or motion, including but not limited to electrical conductivity, pulse, blood pressure, temperature, etc. may be equally suitable.

As noted, world data may include data other than position and/or motion data, and a sensor 4744 may be adapted to establish data other than position and/or motion data. For example, such sensors may include but are not limited to biological sensors such as biomedical and/or biometric sensors. In addition, the use of multiple sensors, including but not limited to sensors such as imagers arranged in stereo pairs, also may be suitable.

The display 4746 is adapted to output the guide data, e.g. so as to be viewable or otherwise perceivable by a person or other subject. The display 4746 may be adapted to output other data besides the guide data, including but not limited to world data and target data. The display 4746 may be, but is not required to be, a visual display (i.e. adapted to output visual guide data), but other arrangements including but not limited to audio and tactile displays may be equally suitable. The display 4746 also may be, but again is not required to be, a three dimensional display such as a stereo display or holographic display.

A range of devices may be suitable for use as the display 4746, including but not limited to light emitting diodes (LED), organic light emitting diodes (OLED), plasma screen panels (PDP), liquid crystal displays (LCD), etc. Likewise, the use of projected or transmitted displays, wherein the viewed surface (if any) is essentially a passive screen for an image projected or otherwise transmitted after being generated elsewhere, may also be suitable. Other arrangements including but not limited to systems that display images directly onto a viewer's eyes also may also be suitable. Either digital or analog display technologies may be suitable. In addition, the use of multiple displays, including but not limited to displays arranged in stereo pairs, also may be suitable.

In particular, the display 4746 may be transparent or semi-transparent, for example so as to passively transmit some or all world data therethrough (that is, a subject might see world data through a transparent display 4746, rather than the display actively outputting world data). However, this is an example only, and a display 4746 that actively outputs some or all world data is not excluded.

A display 4746 may be adapted to output guide data proximate world data, to output guide data associated with world data, and/or to output guide data aligned with world data (e.g. so that guide data representing an outline or model of a hand substantially matches at least some portion of a world-data hand). The display 4746 may output world data and guide data that are proximate, associated, and/or aligned even if the display 4746 is partially or fully transparent as noted above; while for such instance the display 4746 may passively transmit world data, and thus may have limited or no control over where and/or how world data is positioned, oriented, etc., nevertheless the display 4746 may actively output guide data (and thus control position, orientation, etc. of guide data) so that the guide data corresponds with the world data.

More broadly, a display 4746 may be adapted to output any two or more groups of data (world data, target data, guide data, evaluation data, etc.) so as to be proximate, associated, and/or aligned. (It is noted that terms such as "proximate" should be understood to apply to the appearance of the data as output to and/or perceived by a subject. That is, world data for an entity that is several meters distant might be considered to be itself likewise several meters distant. It is not suggested that presenting, for example, guide data proximate world data necessarily requires that guide data be presented at a distance of several meters as well; rather, guide data may be considered proximate guide data—even if world data is several meters away through a transparent display, and guide data is on the surface of that display—so long as a subject would perceive the guide data as being proximate the world data, regardless of the actual distance between guide data and world data.)

Such arrangement of data to be proximate, associated, and/or aligned may facilitate convenient user comparison of different data, e.g. intended or optimal position and/or motion (target data) against actual position and/or motion as executed (world visible). Proximate or adjacent output of data may facilitate side-by-side comparison of data, for example world data against target data and/or guide data. Aligned and/or overlapping data might be transparent or opaque, with areas of overlap and/or difference potentially made readily visible thereby (and/or potentially highlighted, colored, shaded, etc.). However, these are examples, and other arrangements may be equally suitable.

Where groups of data (world data, target data, guide data, evaluation data, etc.) are arranged together, the manner of arrangement will depend to at least some degree upon the nature of the groups of data. Also, as previously noted, each group of data may themselves take a range of forms.

For example, in some embodiments guide data and/or world data may be outputted as models of entities or elements thereof that are to be positioned and/or moved. More concretely, for a position and/or motion related to a human arm, the guide data may be displayed as an image or model of a human arm, and the world data likewise may be displayed as an image of the subject's arm or a model based on the subject's arm. Such an arrangement may be advantageous in that it enables convenient comparison of more-or-less life-like imagery representing an example or target against more-or-less life-like imagery representing the user's real world arm and the motions thereof. However, this is an example only.

In other embodiments, guide data and/or world data may be outputted as indicators or guidelines for the positioning and/or motion of entities. To continue the above example, for a position and/or motion related to a human arm, the guide data could be displayed as initial and final position markers for the subject's arm, as angular scales for the joints of the subject's arm, as pathways indicating example motions, etc. Likewise world data could be displayed as position markers showing actual initial and final locations of the subject's arm, the actual angular range of motion of the joints of the subject's arm, the pathways followed by the subject's arm when moving, etc. Again, this is an example only.

Guide data and world data may be presented as individual still images, as a series of images, as full-motion video, and/or in other modes. Guide data and/or world data may be displayed multiple times. For example, guide data and/or world visual data may be displayed from multiple angles. Alternately, guide data might be presented once to illustrate a position/motion to a subject, then displayed again while the subject executes the position/motion, and/or displayed yet again as a comparison against world visual data (potentially being incorporated at least partly into evaluation data). However, such arrangements are examples only, and other arrangements may be equally suitable.

For some embodiments, the association of guide data and world data may take place in real time, for example being substantially simultaneous. However, for other embodiments guide data and world data might be displayed alternatingly, i.e. first the guide data, then the world data (possibly repeating thereafter).

Guide data and the world data need not take the same form. Thus, guide data might be presented as indicators and guidelines for position and/or motion, while world data might be presented as a realistic image or model of the entity that is to be positioned and/or moved. Likewise, models and/or images may be combined with indicators and guidelines for either or both of the guide data and the world data.

It will be understood that for an arrangement wherein the display is transparent to enable viewing of world data as passively transmitted through the display, at least a portion of the world data necessarily will be realistic imagery of the entity in question (since the entity in question is in fact what is being viewed through the transparent display).

Where used, models and images presented may be two dimensional "flat" images and models, three dimensional "solid" images and models, wireframe models, stick figures, etc. Likewise, where used indicators and guidelines may be two dimensional and/or three dimensional, and/or may include text, non-text symbols, graphics, etc.

The arrangements described for the content and arrangement of guide data and world data are examples only, and other arrangements may be equally suitable. In particular, it is noted that although examples are provided above with regard to association of world data with guide data, similar associations of other groups of data (whether two at a time or more) are equally suitable, and may behave similarly and/or with comparable flexibility. However, guide data and world data are presented as examples since a comparison thereof may have readily understandable results, e.g. by comparing the guide data—that is, the position/motion as instructed—against the world visual data—the position/motion as actually executed—a subject may improve the likelihood of correctly executing a given position and/or motion. The subject may also see, if the position/motion is executed incorrectly, what errors were made, and where and when those errors were made. This can provide guidance for future improvement.

Still with reference to FIG. 47, each of the processor 4742, the sensor 4744, and the display 4746 may be disposed on and/or worn by a subject such as a person, proximate a subject, and/or distal from a subject.

Figure 48:
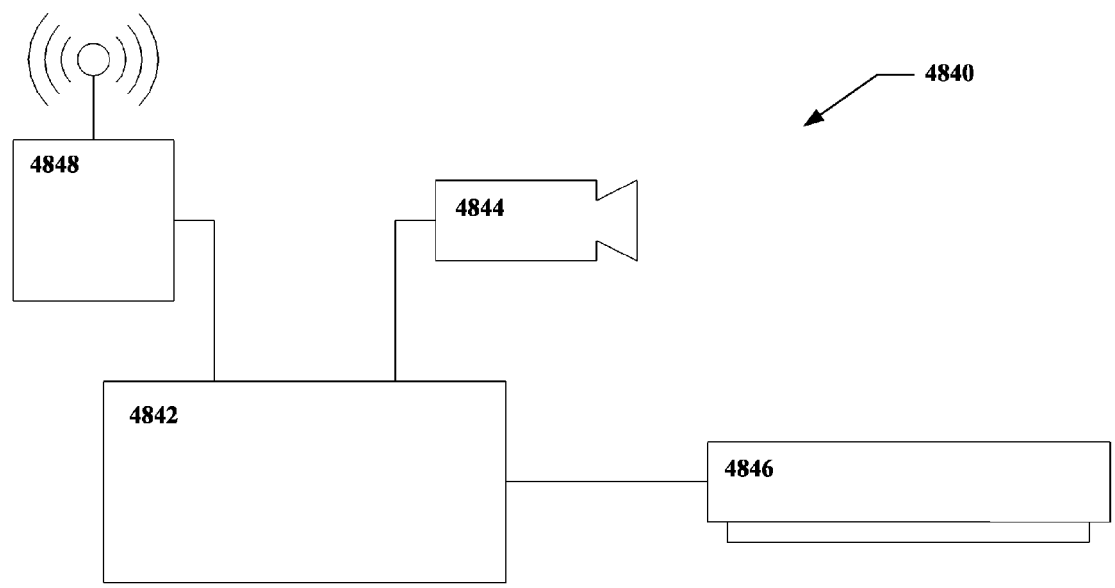

Turning now to FIG. 48, an apparatus 4840 according to the present invention is not limited only to a processor 4842, one or more sensors 4844, and one or more displays 4846. For example, as may be seen in FIG. 48 the apparatus 4840 therein also includes a communicator 4848 in communication with the processor 4842.

The communicator 4848, if present, may be adapted to communicate with some entity external to the apparatus. For example, a communicator 4848 might communicate through wired or wireless communication with some external data system, so as to record data therein, receive data therefrom, send or receive instructions, activate external devices, etc.

A range of devices may be suitable for use as the communicator 4848, including but not limited to wired systems such as wired modems, wireless systems such as wifi transmitters, receivers, and/or transceivers. Other arrangements may be equally suitable.

For embodiments including a communicator 4848, information available to the processor 4842 may be communicated to an external entity, and information from the external entity may be communicated with the processor 4842. For example, feedback regarding world data, target data, guide data, evaluation data, etc. could be so communicated.

In such manner the world signal or other data could be transmitted to some other location for storage, expert analysis, collation into broader research, etc. For example, useful data (potentially part of world data, target data, guide data, and/or evaluation data, though also potentially separate therefrom) might include times and places of positions and motions, repetitions of positions and motions, speeds and performances of positions and motions, etc. Such data may be considered to correspond with the time and place that a subject executed a particular position and/or motion, and the number of times the subject repeated that position and/or motion; such information might be useful, for example, when instructing a subject in physical therapy, wherein the subject should perform certain exercises on certain schedules for best results. However, this is an example only, and other arrangements may be suitable.

For embodiments having a communicator 4848, a subject or subjects may view and/or otherwise consider world data, target data, guide data, evaluation data, etc. without participating in executing positions or motions, or without even being present at the execution of positions or motions.

For example, a subject may utilize an apparatus according to the present invention for physical therapy, while data therefrom is viewed by a trained physical therapist, who may be some considerable distance away. Similarly, a subject may utilize an apparatus according to the present invention to gather world data representing the motion of an industrial machine, while an engineer views the world data (and potentially target data, evaluation data, etc.) at a distant location. (It is noted that such an arrangement might potentially exclude the use of guide data; if world data is collected and compared with target data, without necessarily controlling the world data directly, guide data may not be necessary. To extend the example above, the subject observing the industrial machine may not directly control the machine's motions or other operations, and thus guide data might not be necessary since altering the machine's actual motions— the world data—may not be feasible. Thus, an arrangement of the present invention absent guide data may for certain embodiments be possible and useful. Typically, though not necessarily, such embodiments may utilize evaluation data, so as to compare world data against target data without necessarily requiring or utilizing guide data.) In addition, it may be possible for multiple persons to view world data, target data, guide data, evaluation data, etc. at one time, and/or to view such data at a time other than that when the position and/or motion was executed. However, such arrangements are examples only, and other arrangements may be equally suitable.

Figure 49:
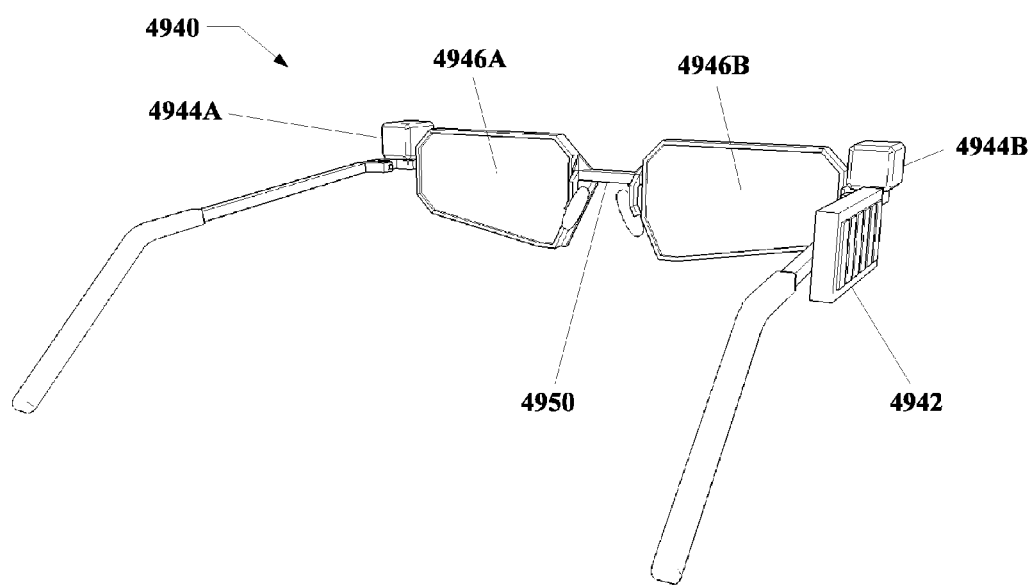
FIG. 49 illustrates an example embodiment of an apparatus according to the present invention, in perspective view.

FIG. 49 shows a perspective view of an example embodiment of an apparatus 4940 for position and motion instruction according to the present invention. In FIG. 49, the apparatus 4940 includes a body 4950. The body 4950 is adapted to be worn by a subject, taking the form of a headset or head mounted display that resembles a pair of glasses.

A processor 4942 is disposed on the body 4950.

First and second sensors 4944A and 4944B are disposed on the body 4950, the sensors 4944A and 4944B being arranged in a stereo pair. Moreover, as shown sensors 4944A and 4944B are arranged such that when a subject wears the body 4950, the field of view of sensors 4944A and 4944B may be substantially aligned with the line of sight of the subject, and/or the field of view of the sensors 4944A and 4944B may substantially match that of the subject (depending on the fields of view of the sensors 4944A and 4944B and/or the subject).

First and second displays 4946A and 4946B are disposed on the body 4950, the displays 4946A and 4946B being arranged in a stereo pair. In addition, in the arrangement shown the displays 4946A and 4946B are arranged such that when a subject wears the body 4950 the displays 4946A and 4946B will be proximate to, substantially in front of, and disposed substantially aligned with the eyes of the subject.

Without reference to a specific illustration, and speaking broadly with regard to the present invention, it is emphasized that methods and apparatuses according to the present invention may exhibit utility in a wide range of functions.

For example, the present invention may instruct users regarding positions and/or motions related to kinesiology, that is, position and motion of the human body. Details such as the nature of guide data, world data, etc. and other features may depend to at least some extent on the particular application, and may vary considerably. Potential applications of the present invention are described below for illustrative purposes. They should not be taken as the only possible applications, however, and the present invention is not limited thereto.

Physical therapy is in at least some instances dependent on proper positioning and motion of the human body in order to achieve proper results while avoiding injury. In some cases, the necessary positions and motions may be non-intuitive, perhaps difficult and/or painful. The present invention enables instruction wherein a human subject may match his or her body positions and motions to an example that can be readily compared with his or her own performance so as to efficiently achieve the benefits of proper physical therapy. Non-restorative physical training (e.g. strength training) likewise may be supported by the present invention.

Sports performance may be to at least some degree a function of proper physical positioning and motion. For example, how and where a tennis racket or golf club is gripped, moved, etc. can have significant effects on how the ball moves. In addition, how and where the racket or club is gripped and moved can have an impact on the likelihood that a subject will sustain injury, whether single-event (e.g. sprains) or repetitive (e.g. "tennis elbow"). Through the present invention a subject may match actual position and motion to examples so as to promote improved performance and/or decreased rates of injury.

Even for non-competitive recreational activities wherein performance is not considered critical, and/or wherein injury is unlikely, the present invention may promote proper form. For example, although a waltz may not be "scored", nevertheless there may be "right" and "wrong" ways for a subject to move and/or position his or her body. Distinctions between proper and improper form can be observed by comparing the subject's world body position and motion with guide and/or target position and motion data according to the present invention.

Similarly, non-recreational activities wherein proper form is of importance may be instructed through the present invention. For example, many actions performed by medical professionals for diagnosis, treatment, etc., can be extremely sensitive in terms of both where those actions are performed and how those actions are performed. When performing reduction of a dislocated shoulder, for example, where to grip and how to move the patient's body are of definite importance. Similarly, for certain surgical procedures even such subtle details as the precise position of fingers on a scalpel or other instrument may be important. The present invention may offer instruction regarding such actions.

In addition, it is noted that for medical training, real-life training opportunities may be limited. Moreover, practicing certain medical procedures on a live person as a training exercise may be undesirable. Thus, non-patient training such as that provided by the present invention may be of particular importance.

Likewise, non-training medical applications may also be facilitated by instruction with the present invention. Certain injuries, conditions, etc. may be diagnosed and/or evaluated at least in part by comparing a patient's world body position or body motion to a target and/or guide position or motion therefor. One such example might be monitoring of Huntington's disease, wherein a subject might attempt to move his or her hand to trace a line or other simple shape (i.e. the line or shape might serve as target data and/or guide data). The degree to which uncontrolled motions cause the subject's hand to deviate from that line may be used to determine the status and progress of the disease.

While certain examples presented herein refer to instruction in terms of training or education, it is noted that "instruction" in the sense that the term is used with regard to the present invention is not necessarily limited only to training or educational environments, and that the present invention likewise is not limited to training or educational applications. Thus the present invention may be used to support proper execution of tasks "for real", i.e. outside of a training environment. For example, a subject attempting to properly execute first aid or CPR might rely on the instruction provided by this invention in a real emergency, regardless of whether that subject had previous training or education in first aid/CPR. Similarly, a soldier attempting to disarm an improvised explosive device might benefit from real-time instruction as to proper procedure and known hazards, even if (and perhaps particularly if) he or she has no previous training in working with such munitions.

Even in matters wherein proper body form is of lesser or no significance, instruction according to the present invention may be beneficial. For example, for a subject servicing a motor vehicle, how that subject positions his or her body to grip a particular mechanical part may be of little consequence, but how that part must be moved in order to be removed, attached or adjusted may be very significant, and may also be non-intuitive (especially for complex mechanisms such as engine components). In many cases, the essence of how a device is built, adjusted, and/or repaired may be related to how pieces are positioned and/or moved with respect to one another. The present invention may be beneficial in such instances.

As previously stated, the present invention is not limited only to kinesiology, nor to the position/motion of a subject's body. Evaluating actual (world) position and/motion compared with example (target and/or guide) position and/or motion may be illuminating for other tasks. For example, returning to the example of the engine above, how different components in an engine move can provide guidance as to whether the engine is operating properly, and/or what problems the engine may have if the engine is not operating properly (e.g. what components are broken, missing, misadjusted, etc.).

The range of positions and/or motions instructed through the present invention is extremely broad, and is not limited to those described. Additional tasks include, but are not limited to, physical fitness instruction, posture training, performance training, combat training, time and motion studies, and task-related physical performance evaluations, playing of musical instruments, martial arts, typing, writing, and assorted craft, fabrication, and repair skills.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A machine-implemented method, comprising:
   sensing world data via a sensor of a motion instruction apparatus, said world data comprising a world position of a body part of a user;
   determining target data via a processor of the motion instruction apparatus, said target data comprising a target position of the body part of the user;
   producing visual guide data via the processor, said visual guide data being based on the target data and the world data;
   displaying said visual guide data overlaid onto the world data to the user via a pass-through display of the motion instruction apparatus;
      wherein said visual guide data comprises at least one of a group consisting of visual virtual reality data and visual augmented reality data; and
   repeating, in response to a movement of the body part, the sensing, determining, producing and displaying steps until the world position of the body part matches the target position of the body part to within a predetermined margin;
   signaling, via the pass-through display, to the user that the world position matches the target position.

2. The method of claim 1, wherein:
   said world data comprises a world point of contact with said entity.

3. The method of claim 1, wherein:
   said target data comprises a target point of contact with said entity.

4. The method of claim 1, wherein:
   said guide data comprises a guide point of contact with said entity.

5. The method of claim 1, wherein:
   said world data comprises a world path for said entity.

6. The method of claim 1, wherein:
   said target data comprises a target path for said entity.

7. The method of claim 1, wherein:
   said guide data comprises a guide path for said entity.

8. The method of claim 1 wherein:
   said world data comprises a world model for at least a portion of said entity.

9. The method of claim 1, wherein:
   said target data comprises a target model for at least a portion of said entity.

10. The method of claim 1, wherein:
    said guide data comprises a guide model for at least a portion of said entity.

11. The method of claim 1, wherein:
    said guide data comprises a visual representation of at least a portion of said entity.

12. The method of claim 1, wherein:
    said guide data comprises a visual representation of at least a portion of said subject.

13. The method of claim 12, wherein:
    said visual representation is at least substantially anthropomorphic.

14. The method of claim 1, comprising:
    outputting said guide data such that at least a portion of said world data is visible therewith.

15. The method of claim 1, comprising:
    passing at least a portion of said world data to said subject.

16. The method of claim 1, comprising:
    outputting at least a portion of said world data to said subject.

17. The method of claim 1, comprising:
    outputting said guide data at least substantially aligned with said entity.

18. The method of claim 1, comprising:
    outputting said guide data at least substantially aligned with said world data.

19. The method of claim 1, wherein:
    said target data is representative of at least one of a group consisting of physical therapy, sports activity, recreational activity, physical training, medical training, medical treatment, medical diagnostics, first aid/cpr, fabrication, repair, and device/system operation.

20. The method of claim 1, wherein:
    said world entity comprises a mechanical system.

21. The method of claim 1, wherein:
    said world entity comprises at least one of a virtual reality entity and an augmented reality entity.

22. The method of claim 1, comprising:
    dynamically updating at least a portion of said world data until a condition is satisfied.

23. The method of claim 1, comprising:
    dynamically updating at least a portion of said target data responsive to said world data until a condition is satisfied.

24. The method of claim 1, comprising:
dynamically updating at least a portion of said guide data responsive to said target data until a condition is satisfied.

25. The method of claim 1, comprising:
establishing evaluation data substantially representing an evaluation of said world data against said target data.

26. The method of claim 25, comprising:
dynamically updating at least a portion of said evaluation data until a condition is satisfied.

27. The method of claim 25, comprising:
outputting at least a portion of said evaluation data to said subject.

28. The method of claim 27, wherein:
said evaluation data comprises at least one of a group consisting of text instructions, audio instructions, a visual image, an animation, and an icon.

29. A machine-implemented method, comprising:
sensing visual world data with a sensor, said visual world data comprising a world motion of a body part of a user;
communicating said visual world data to a processor;
determining visual target data in said processor with respect to said visual world data, said visual target data comprising a target motion of said body part;
generating visual guide data in said processor based on said visual world data and said visual target data;
displaying said visual guide data overlaid onto the world data from said processor to said user via a pass-through display;
  wherein said visual guide data comprises visual augmented reality data displayed in conjunction with said visual world data on said pass-through display; and
repeating, in response to a movement of the body part, the sensing communicating, determining, generating, and displaying steps until the world motion of the body part matches the target motion of the body part to within a predetermined margin;
signaling, via the pass-through display, to the user that the world position matches the target position.

30. The method of claim 1, wherein:
said visual guide data comprises at least one of a group consisting of text instructions, a visual image, an animation, and an icon.

* * * * *